United States Patent
O'Driscoll

(10) Patent No.: US 10,158,174 B2
(45) Date of Patent: Dec. 18, 2018

(54) ADAPTIVE ANTENNA TUNING BASED ON MEASURED ANTENNA IMPEDANCE

(71) Applicant: Verily Life Sciences LLC, Mountain View, CA (US)

(72) Inventor: Stephen O'Driscoll, San Francisco, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 0 days.

(21) Appl. No.: 15/816,237

(22) Filed: Nov. 17, 2017

(65) Prior Publication Data

US 2018/0076524 A1    Mar. 15, 2018

Related U.S. Application Data

(63) Continuation of application No. 14/303,070, filed on Jun. 12, 2014, now Pat. No. 9,825,364.

(51) Int. Cl.
*G01R 29/10* (2006.01)
*H01Q 7/00* (2006.01)
(Continued)

(52) U.S. Cl.
CPC ............. *H01Q 7/005* (2013.01); *G02C 7/04* (2013.01); *H01Q 1/273* (2013.01); *H04B 1/0343* (2013.01);
(Continued)

(58) Field of Classification Search
None
See application file for complete search history.

(56) References Cited

U.S. PATENT DOCUMENTS 8,325,097 B2 *   12/2012   McKinzie, III ...... H01Q 9/0421
                                                      343/703
8,634,928 B1     1/2014    O'Driscoll et al.
(Continued)

FOREIGN PATENT DOCUMENTS

| EP | 0986836 B1   | 3/2000 |
| EP | 2051185 A1   | 4/2009 |
| WO | 2013033277 A1 | 3/2013 |

OTHER PUBLICATIONS

International Search Report and Written Opinion of International Application No. PCT/US2015/032989 dated Aug. 27, 2015.

*Primary Examiner* — Trinh Dinh
(74) *Attorney, Agent, or Firm* — McDonnell Boehnen Hulbert & Berghoff LLP

(57) ABSTRACT

A system includes an antenna, an impedance measurement circuit, an impedance tuning circuit, and a controller. The impedance measurement circuit can include a test current source that conveys a test current through the antenna, and a voltage sensor that measure a voltage across the antenna while the test current is conveyed through the antenna. The impedance tuning circuit can be coupled to the antenna leads and can include one or more reactive elements that can be selectively coupled to the antenna, or otherwise adjusted, to effect adjustment of the impedance connected to the antenna. The controller can: (i) use the impedance measurement circuit to obtain a measurement indicative of an impedance of the antenna; (ii) determine an adjustment to the impedance tuning circuit based on the obtained measurement; and (iii) cause the impedance tuning circuit to make the determined adjustment.

11 Claims, 11 Drawing Sheets

(51) Int. Cl.
  *H01Q 1/27* (2006.01)
  *G02C 7/04* (2006.01)
  *H04B 1/034* (2006.01)
  *H04B 1/04* (2006.01)
  *H04B 1/18* (2006.01)
  *H04B 1/3827* (2015.01)

(52) U.S. Cl.
  CPC .............. *H04B 1/0458* (2013.01); *H04B 1/18* (2013.01); *H04B 1/385* (2013.01); *H04B 2001/3855* (2013.01); *H04B 2001/3861* (2013.01); *H04B 2001/3866* (2013.01)

(56) References Cited

U.S. PATENT DOCUMENTS

| | | |
|---|---|---|
| 9,825,364 B2 | 11/2017 | O'Driscoll |
| 2002/0047009 A1* | 4/2002 | Flugstad .................. A23B 4/01 |
| | | 219/771 |
| 2003/0205571 A1* | 11/2003 | Flugstad .................. A23B 4/01 |
| | | 219/497 |
| 2004/0009754 A1 | 1/2004 | Smith, Jr. |
| 2007/0035356 A1 | 2/2007 | Ranta |
| 2007/0091006 A1 | 4/2007 | Thober et al. |
| 2008/0180345 A1 | 7/2008 | Larson et al. |
| 2013/0016018 A1 | 1/2013 | Ham |
| 2013/0187828 A1 | 7/2013 | Desclos et al. |
| 2013/0187829 A1 | 7/2013 | Pajona et al. |
| 2013/0194540 A1 | 8/2013 | Pugh et al. |
| 2013/0331042 A1* | 12/2013 | See ..................... H04W 52/367 |
| | | 455/77 |
| 2014/0107444 A1 | 4/2014 | Liu |
| 2014/0145901 A1 | 5/2014 | Anand et al. |

\* cited by examiner

US 10,158,174 B2

ADAPTIVE ANTENNA TUNING BASED ON MEASURED ANTENNA IMPEDANCE

CROSS-REFERENCE TO RELATED APPLICATIONS

This application is a continuation of U.S. patent application Ser. No. 14/303,070, filed Jun. 12, 2014, which is incorporated herein by reference.

BACKGROUND

Unless otherwise indicated herein, the materials described in this section are not prior art to the claims in this application and are not admitted to be prior art by inclusion in this section.

In order to maximize the energy/power extracted from or input to an antenna the impedance of the circuits connected to the antenna should be matched to the impedance of the antenna. Otherwise, the signal/energy transfer between the antenna and the connected circuitry is degraded. If the antenna is used in a wireless power link this means reduced power will be transferred from the antenna to the power harvesting electronics. If the antenna is used in a communication link this means reduced signal-to-noise ratio for the signal transferred from the antenna to the receiver.

SUMMARY

A system includes an antenna, an impedance measurement circuit, an impedance tuning circuit, and a controller. The impedance measurement circuit can include a test current source that conveys a test current through the antenna, and a voltage sensor that measure a voltage across the antenna while the test current is conveyed through the antenna. The impedance tuning circuit can be coupled to the antenna leads and can include one or more reactive elements that can be selectively coupled to the antenna, or otherwise adjusted, to effect adjustment of the impedance connected to the antenna. The controller can: (i) use the impedance measurement circuit to obtain a measurement indicative of an impedance of the antenna; (ii) determine an adjustment to the impedance tuning circuit based on the obtained measurement; and (iii) cause the impedance tuning circuit to make the determined adjustment.

Some embodiments of the present disclosure provide a system. The system can include an antenna, an impedance measurement circuit, an impedance tuning circuit, and a controller. The impedance measurement circuit can be electrically coupled to the antenna. The impedance measurement circuit can be configured to be used to obtain a measurement indicative of an impedance of the antenna. The impedance tuning circuit can be electrically coupled to the antenna. The impedance tuning circuit can include one or more reactive elements that can be used to adjust the impedance coupled to the antenna. The controller can be configured to: (i) use the impedance measurement circuit to obtain a measurement indicative of an impedance of the antenna; (ii) determine an adjustment to the impedance tuning circuit based on the obtained measurement; and (iii) cause the impedance tuning circuit to make the determined adjustment.

Some embodiments of the present disclosure provide a method. The method can include obtaining a measurement indicative of an impedance of an antenna. The method can include determining, based on the obtained measurement, an adjustment to an impedance tuning circuit coupled to the antenna. The impedance tuning circuit includes one or more reactive elements that can be used to adjust the impedance coupled to the antenna. The method can include causing the impedance tuning circuit to make the determined adjustment.

Some embodiments of the present disclosure provide a body-mountable device including a polymeric material, a substrate, an antenna, an impedance measurement circuit, an impedance tuning circuit, and a controller. The polymeric material can be formed to include a body-mountable surface. The substrate can be at least partially embedded within the polymeric material. The antenna can be disposed on the substrate. The impedance measurement circuit can be disposed on the substrate. The impedance measurement circuit can be coupled to the antenna. The impedance measurement circuit can be configured to be used to obtain a measurement indicative of an impedance of the antenna. The impedance tuning circuit can be disposed on the substrate. The impedance tuning circuit is coupled to the antenna. The impedance tuning circuit can include one or more reactive elements that can be used to adjust the impedance coupled to the antenna. The controller can be disposed on the substrate. The controller can be configured to: (i) use the impedance measurement circuit to obtain a measurement indicative of an impedance of the antenna; (ii) determine an adjustment to the impedance tuning circuit based on the obtained measurement; and (iii) cause the impedance tuning circuit to make the determined adjustment.

Some embodiments of the present disclosure provide means for obtaining a measurement indicative of an impedance of an antenna. Some embodiments of the present disclosure provide means for determining, based on the obtained measurement, an adjustment to an impedance tuning circuit coupled to the antenna. The impedance tuning circuit includes one or more reactive elements that can be used to adjust the impedance coupled to the antenna. Some embodiments of the present disclosure provide means for causing the impedance tuning circuit to make the determined adjustment.

These as well as other aspects, advantages, and alternatives, will become apparent to those of ordinary skill in the art by reading the following detailed description, with reference where appropriate to the accompanying drawings.

DETAILED DESCRIPTION

Figure 1:
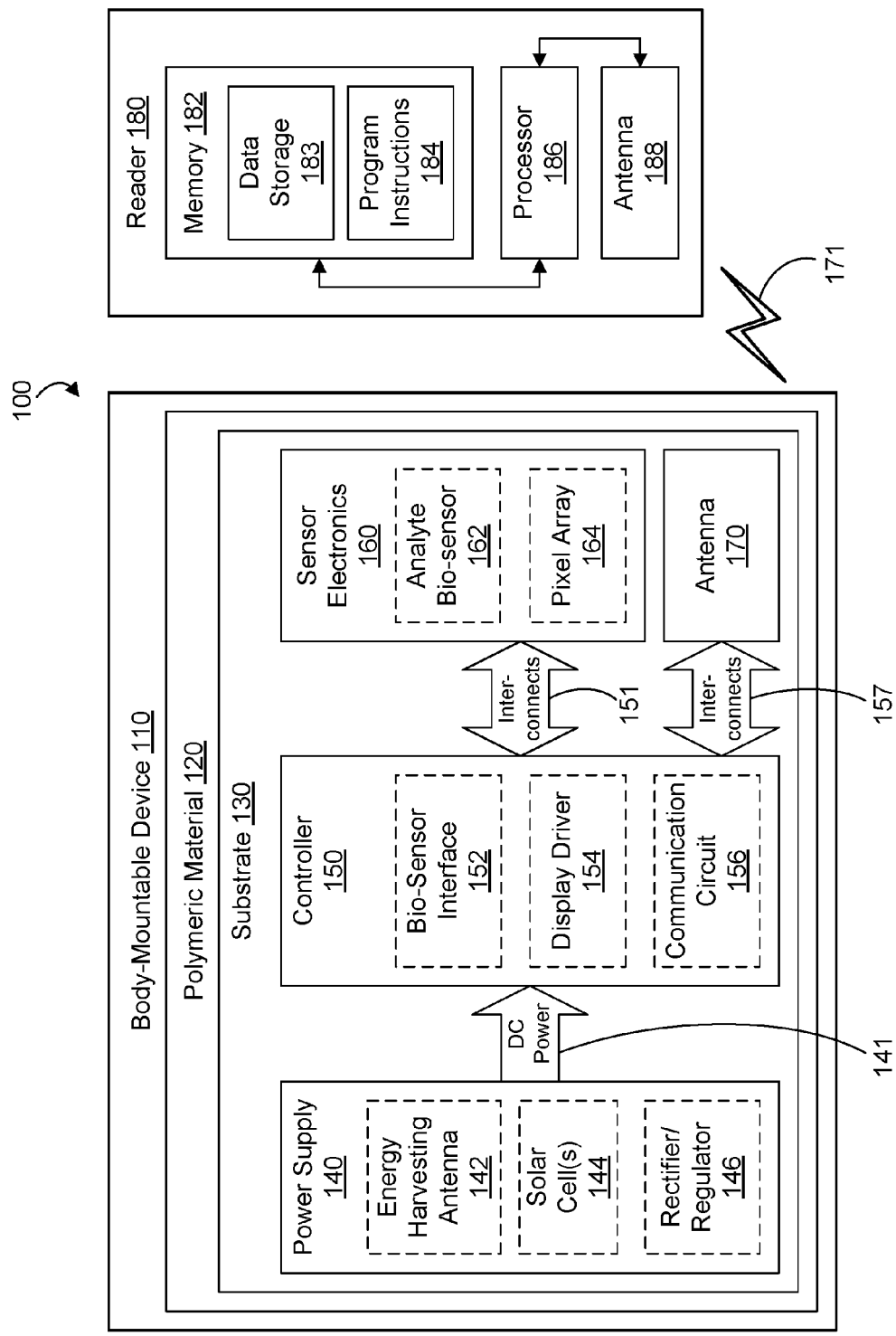
FIG. 1 is a block diagram of an example system that includes a body-mountable device in wireless communication with an external reader.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A body-mountable electronics platform can include bio-interactive electronics, such as sensors and the like, and an antenna to facilitate communication with an external reader. The body-mountable electronics platform can also harvest energy from incident radiation to power the electronics. In some cases, incident light may energize photovoltaic cells. Additionally or alternatively, power can be provided by incident radio frequency radiation inductively harvested using the antenna. A rectifier and/or regulator can be incorporated with the control electronics to generate a DC voltage to power the electronics from the harvested energy. The antenna can be arranged as a loop of conductive material with leads connected to the control electronics. In some embodiments, such a loop antenna can also wirelessly communicate the sensor readings to an external reader by modifying the backscatter radiation from the antenna in a manner that can be detected by the reader.

One such body-mountable electronic device may be an eye-mountable device formed of a polymeric material that is shaped to be contact mounted to an eye, similar to a contact lens. A substrate embedded within the polymeric material can be used to mount bio-interactive electronics and associated power and communication electronics. In one example, an antenna disposed on the substrate is used to harvest energy from incident radio frequency radiation, and the harvested energy can be used, via a rectifier and voltage regulator, to power the remaining electronics. Communication electronics can be used to modulate the impedance of the energy-harvesting antenna to cause corresponding modifications of the antenna's backscatter radiation, which can then be detected by a reader.

The impedance exhibited by the antenna may change over time due to various factors. Changes in antenna impedance may occur for example, due to variations in environmental temperature, humidity, antenna geometry (e.g., due to flexing), and/or other changes in the near field of the antenna, such as distributions of dielectric materials. For instance, in body-mountable and/or implantable electronic devices, an antenna may be at least partially surrounded by variable distributions of tissue and/or bodily fluids. As a result, the antenna impedance will change from person to person (e.g., due to different body characteristics), and also over time for a given person (e.g., due to changes in mounting location). Changing the distribution of physiological material (tissue, fluid, etc.) changes the dielectric loading of the antenna, and thereby changes the impedance exhibited by the antenna. In an eye-mountable device, dielectric variability may be due to variations in corneal thickness, relative position of eyelids, distribution of tear fluid, and so forth.

To ensure efficient power transfer to/from an antenna, the driving transceiver circuitry can be conjugate matched to the antenna impedance. Conventional approaches to tuning an antenna may provide a fixed impedance adjustment via a resonant tuning circuit, but such approaches are ill-suited to antennas that exhibit temporal variations in impedance. Conventional approaches can therefore lead to impedance mismatches between the antenna and its connected circuitry. The mismatch will result in reduced power transfer in a wireless power link and reduced achievable data rate in a wireless data link.

Systems disclosed herein provide for dynamically adjusting an adjustable impedance circuit to account for changes in the antenna impedance over time. An impedance measurement circuit first measures the impedance of the antenna, and then the measurement is used as a basis to adjust an impedance tuning circuit as needed. The impedance matching circuit is situated between the antenna and the transceiver and/or energy harvesting circuitry that receives signals from the antenna. The impedance tuning circuit can have multiple reactive elements (e.g., inductors and/or capacitors) that can be selectively connected or disconnected from the antenna. Connecting the reactive components in different configurations thereby adjusts the impedance of the tuning circuit. In some cases, the impedance tuning circuit may additionally or alternatively include one or more components with adjustable reactances (e.g., a varactor that exhibits a capacitance dependent on an applied voltage). The impedance tuning circuit can be adjusted such that total impedance of the circuitry connected to the antenna (i.e., the transceiver and the tuning circuit) is conjugate matched to the measured antenna impedance. The measurement and adjustment operations can be performed iteratively to dynamically tune the impedance of the antenna-connected circuitry in accordance with the dynamically varying antenna impedance.

A measurement circuit can be used for obtaining a measurement of the antenna impedance. The measurement circuit can include a current source that sends a test current through the antenna at a desired frequency, and a voltage sensor that measures the voltage across the antenna in response to the current. The output from the voltage sensor provides an indication of the voltage waveform, which can then be measured and converted to digital values (e.g., using an analog-to-digital converter). The test current can also be measured to provide an indication of the current waveform. In some cases, the test current may be measured through a current mirror, which allows for measuring the mirrored test current without loading the antenna. To measure the mirrored test current, a transimpedance amplifier may be connected to the current mirror, and the output can be measured and converted to digital values using an analog-to-digital converter.

Moreover, a single analog-to-digital converter may be used to generate digital values for both the voltage measurements and the current measurements. A multiplexer may be used to connect the single analog-to-digital converter to either the voltage amplifier or the transimpedance amplifier.

The test current and resulting voltage can each be measured to obtain data over several cycles at the frequency of interest (i.e., the frequency of the test current), and a digital controller can be used to determine an impedance adjustment to make based on the measurements. The digital controller can then cause the impedance tuning circuit to make the determined adjustment, such as by setting control lines to turn transistors on or off and thereby selectively connect capacitive and/or inductive components to the tuning circuit. Furthermore, in some examples, the adjusting to the impedance tuning circuit may be regulated by an analog circuit that functions to generate suitable control signals to the impedance tuning circuit based on the impedance of the antenna.

In some examples, the digital controller (or a hardware equivalent) may determine phase information of the antenna impedance using quadratic down-conversions of the sampled waveforms. For instance, the real and imaginary contributions to the impedance (e.g., resistive and reactive contributions) can be separately extracted from the obtained voltage and current measurements. The phase can then be calculated as the arctangent of the ratio of the magnitude of the imaginary component to the magnitude of the real component. In some cases, the conjugate matching procedure may proceed by only adjusting the reactive contribution to the impedance.

II. Example Body-Mountable Electronics Platform

FIG. 1 is a block diagram of a system 100 that includes a body-mountable device 110 in wireless communication with an external reader 180. The exposed regions of the body-mountable device 110 are made of a polymeric material 120 formed to be contact-mounted to a corneal surface of an eye. A substrate 130 is embedded in the polymeric material 120 to provide a mounting surface for a power supply 140, a controller 150, sensor electronics 160, and a communication antenna 170. The sensor electronics 160 are operated by the controller 150. The power supply 140 supplies operating voltages to the controller 150 and/or the sensor electronics 160. The antenna 170 is operated by the controller 150 to communicate information to and/or from the body-mountable device 110. The antenna 170, the controller 150, the power supply 140, and the sensor electronics 160 can all be situated on the embedded substrate 130. Because the body-mountable device 110 includes electronics and is configured to be contact-mounted to an eye, it is also referred to herein as an ophthalmic electronics platform.

To facilitate contact-mounting, the polymeric material 120 can have a concave surface configured to adhere ("mount") to a moistened corneal surface (e.g., by capillary forces with a tear film coating the corneal surface). Additionally or alternatively, the device 110 can be adhered by a vacuum force between the corneal surface and the polymeric material 120 due to the concave curvature. While mounted with the concave surface against the eye, the outward-facing surface of the polymeric material 120 can have a convex curvature that is formed to not interfere with eye-lid motion while the body-mountable device 110 is mounted to the eye. For example, the polymeric material 120 can be a substantially transparent curved polymeric disk shaped similarly to a vision correction contact lens.

The polymeric material 120 can include one or more biocompatible materials, such as those employed for use in contact lenses or other ophthalmic applications involving direct contact with the corneal surface. The polymeric material 120 can optionally be formed in part from such biocompatible materials or can include an outer coating with such biocompatible materials. The polymeric material 120 can include materials configured to moisturize the corneal surface, such as hydrogels and the like. In some embodiments, the polymeric material 120 can be a deformable ("non-rigid") material to enhance wearer comfort. In some embodiments, the polymeric material 120 can be shaped to provide a predetermined, vision-correcting optical power, such as can be provided by a contact lens. Moreover, the polymeric material 120 may be formed to facilitate mounting to another body surface, such as a tooth surface, ear surface, skin surface, etc., and the polymeric material 120 may have properties (e.g., flexibility, surface hardness, lubricity, etc.) selected to be suitable for such mounting locations.

The substrate 130 includes one or more surfaces suitable for mounting the sensor electronics 160, the controller 150, the power supply 140, and the antenna 170. The substrate 130 can be employed both as a mounting platform for chip-based circuitry (e.g., by flip-chip mounting to connection pads) and/or as a platform for patterning conductive materials (e.g., gold, platinum, palladium, titanium, copper, aluminum, silver, metals, other conductive materials, combinations of these, etc.) to create electrodes, interconnects, connection pads, antennae, etc. In some embodiments, substantially transparent conductive materials (e.g., indium tin oxide) can be patterned on the substrate 130 to form circuitry, electrodes, etc. For example, the antenna 170 can be formed by forming a pattern of gold or another conductive material on the substrate 130 by deposition, photolithography, electroplating, etc. Similarly, interconnects 151, 157 between the controller 150 and the sensor electronics 160, and between the controller 150 and the antenna 170, respectively, can be formed by depositing suitable patterns of conductive materials on the substrate 130. A combination of microfabrication techniques including, without limitation, the use of photoresists, masks, deposition techniques, and/or plating techniques can be employed to pattern materials on the substrate 130.

The substrate 130 can be a relatively rigid material, such as polyethylene terephthalate ("PET"), parylene, or another material configured to structurally support the circuitry and/or chip-based electronics within the polymeric material 120. The body-mountable device 110 can alternatively be arranged with a group of unconnected substrates rather than a single substrate. For example, the controller 150 and a sensor in sensor electronics 160 can be mounted to one substrate, while the antenna 170 is mounted to another substrate and the two can be electrically connected via the interconnects 157. In another example, the substrate 130 can include separate partitions that each support separated, overlapped coiled portions of the antenna 170. Such as, for example, an example in which the antenna 170 is divided into multiple windings that wrap around the body-mountable device 110 circumferentially at respective radii, and are connected in parallel and/or in series. To facilitate movement of the individual windings with respect to one another, and thereby enhance flexibility of the body-mountable device 110, and help prevent binding, etc., the individual windings may each be mounted on divided portions of the substrate 130, which may substantially correspond to the windings of such an antenna.

The substrate 130 has a width sufficient to provide a mounting platform for the embedded electronics components. The substrate 130 can have a thickness sufficiently small to allow the substrate 130 to be embedded in the polymeric material 120 without influencing the profile of the body-mountable device 110. The substrate 130 can have a thickness sufficiently large to provide structural stability suitable for supporting the electronics mounted thereon. For example, in an implementation in which the body-mountable device 110 is an eye-mountable device, the substrate 130 can be shaped as a ring with a diameter of about 10 millimeters, a radial width of about 1 millimeter (e.g., an outer radius 1 millimeter larger than an inner radius), and a thickness of about 50 micrometers. The substrate 130 can optionally be aligned with the curvature of an eye-mountable surface of the polymeric material 120 (e.g., the convex or concave surfaces). For example, the substrate 130 can be shaped along the surface of an imaginary cone between two circular segments that define an inner radius and an outer radius. In such an example, the surface of the substrate 130 along the surface of the imaginary cone defines an inclined surface that is approximately aligned with the curvature of the eye mounting surface (concave) and/or outward surface (convex) at that radius.

The power supply 140 is configured to harvest ambient energy to power the controller 150 and sensor electronics 160. For example, a radio-frequency energy-harvesting antenna 142 can capture energy from incident radio radiation. Additionally or alternatively, solar cell(s) 144 ("photovoltaic cells") can capture energy from incoming ultraviolet, visible, and/or infrared radiation. Furthermore, an inertial power scavenging system can be included to capture energy from ambient vibrations. The energy harvesting antenna 142 can optionally be a dual-purpose antenna that is also used to communicate information to the external reader 180. That is, the functions of the communication antenna 170 and the energy harvesting antenna 142 can be accomplished with the same physical antenna.

A rectifier/regulator 146 can be used to condition the captured energy to a stable DC supply voltage 141 that is supplied to the controller 150. For example, the energy harvesting antenna 142 can receive incident radio frequency radiation. Varying electrical signals on the leads of the antenna 142 are output to the rectifier/regulator 146. The rectifier/regulator 146 rectifies the varying electrical signals to a DC voltage and regulates the rectified DC voltage to a level suitable for operating the controller 150. Additionally or alternatively, output voltage from the solar cell(s) 144 can be regulated to a level suitable for operating the controller 150. The rectifier/regulator 146 can include one or more energy storage devices to mitigate high frequency variations in the ambient energy gathering antenna 142 and/or solar cell(s) 144. For example, one or more energy storage devices (e.g., a capacitor, a battery, etc.) can be connected in parallel across the outputs of the rectifier 146 to regulate the DC supply voltage 141 and configured to function as a low-pass filter.

The controller 150 can be turned on when the DC supply voltage 141 is provided to the controller 150, and the logic in the controller 150 can then operate the sensor electronics 160 and the antenna 170. The controller 150 can include logic circuitry configured to operate the sensor electronics 160 so as to sense a characteristic of the environment of the body-mountable device 110. For example, the sensor electronics 160 may include an analyte bio-sensor 162 configured to sense an analyte in the biological environment (e.g., tear film) of the body-mountable device 110. Additionally or alternatively, the sensor electronics 160 could include a light sensor 164 that is configured to detect an intensity of incident light, or perhaps an image sensor configured to capture an image from a perspective of the body-mountable device 110 (e.g., an external environment outside of the eye or an internal environment within the eye).

In one example, the controller 150 includes a bio-sensor interface module 152 that is configured to operate analyte bio-sensor 162. The analyte bio-sensor 162 can be, for example, an amperometric electrochemical sensor that includes a working electrode and a reference electrode. A voltage can be applied between the working and reference electrodes to cause an analyte to undergo an electrochemical reaction (e.g., a reduction and/or oxidation reaction) at the working electrode. The electrochemical reaction can generate an amperometric current that can be measured through the working electrode. The amperometric current can be dependent on the analyte concentration. Thus, the amount of the amperometric current that is measured through the working electrode can provide an indication of analyte concentration. In some embodiments, the bio-sensor interface module 152 can be a potentiostat configured to apply a voltage difference between working and reference electrodes while measuring a current through the working electrode.

In some instances, a reagent can also be included to sensitize the electrochemical sensor to one or more desired analytes. For example, a layer of glucose oxidase ("GOx") proximal to the working electrode can catalyze glucose oxidation to generate hydrogen peroxide ($H_2O_2$). The hydrogen peroxide can then be electro-oxidized at the working electrode, which releases electrons to the working electrode, resulting in an amperometric current that can be measured through the working electrode.

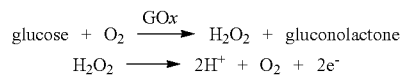

$$\text{glucose} + O_2 \xrightarrow{\text{GOx}} H_2O_2 + \text{gluconolactone}$$
$$H_2O_2 \longrightarrow 2H^+ + O_2 + 2e^-$$

The current generated by either reduction or oxidation reactions is approximately proportionate to the reaction rate. Further, the reaction rate is dependent on the rate of analyte molecules reaching the electrochemical sensor electrodes to fuel the reduction or oxidation reactions, either directly or catalytically through a reagent. In a steady state, where analyte molecules diffuse to the electrochemical sensor electrodes from a sampled region at approximately the same rate that additional analyte molecules diffuse to the sampled region from surrounding regions, the reaction rate is approximately proportionate to the concentration of the analyte molecules. The current measured through the working electrode thus provides an indication of the analyte concentration.

The controller 150 can optionally include a display driver module 154 for operating a pixel array 164. The pixel array 164 can be an array of separately programmable light transmitting, light reflecting, and/or light emitting pixels arranged in rows and columns. The individual pixel circuits can optionally include liquid crystal technologies, microelectromechanical technologies, emissive diode technologies, etc. to selectively transmit, reflect, and/or emit light according to information from the display driver module 154. Such a pixel array 164 can also optionally include more than one color of pixels (e.g., red, green, and blue pixels) to render visual content in color. The display driver module 154 can include, for example, one or more data lines providing programming information to the separately programmed pixels in the pixel array 164 and one or more addressing lines for setting groups of pixels to receive such programming information. Such a pixel array 164 situated on the eye can also include one or more lenses to direct light from the pixel array to a focal plane perceivable by the eye.

The controller 150 can also include a communication circuit 156 for sending and/or receiving information via the antenna 170. The communication circuit 156 can optionally include one or more oscillators, mixers, frequency injectors, etc. to modulate and/or demodulate information on a carrier frequency to be transmitted and/or received by the antenna 170. In some examples, the body-mountable device 110 is configured to indicate an output from a bio-sensor, light sensor, and/or image sensor by modulating an impedance of the antenna 170 in a manner that can be perceived by the external reader 180. For example, the communication circuit 156 can cause variations in the amplitude, phase, and/or frequency of backscatter radiation from the antenna 170, and such variations can be detected by the reader 180.

The controller 150 is connected to the sensor electronics 160 via interconnects 151. For example, where the controller 150 includes logic elements implemented in an integrated circuit to form the bio-sensor interface module 152 and/or light sensor interface 154, a patterned conductive material (e.g., gold, platinum, palladium, titanium, copper, aluminum, silver, metals, combinations of these, etc.) can connect a terminal on the chip to the sensor electronics 160. Similarly, the controller 150 is connected to the antenna 170 via interconnects 157.

In some embodiments, the interconnects 157 may further include an impedance tuning circuit that connects the antenna 170 to the controller 150. The impedance tuning circuit may function to selectively connect reactive components to the antenna 170 so as to adjust the impedance of circuit components connected to the antenna 170 to be conjugate matched with the impedance of the antenna 170. In particular, the combined impedance of the interconnects 157 (including the tuning circuit components) and the communication circuit 156 (e.g., a transceiver) can be conjugate matched to the impedance of the antenna 170. Moreover, the matching procedure can be based on real time measurements of the antenna impedance so as to account for variations in the antenna impedance, which may occur due to variable near field conditions for antennas situated in body-mountable devices. To make impedance adjustments based on the real time impedance of the antenna 170, an impedance measurement circuit can also be associated with the controller 150 and/or interconnects 157. The impedance measurement circuit can provide a test current through the antenna 170, and measure a resulting voltage across the antenna 170 to ascertain the impedance. Upon determining the impedance of the antenna 170, an adjustment to the impedance tuning circuit that can match impedances can be determined, and the tuning circuit can be adjusted accordingly.

It is noted that the block diagram shown in FIG. 1 is described in connection with functional modules for convenience in description. However, embodiments of the body-mountable device 110 can be arranged with one or more of the functional modules ("sub-systems") implemented in a single chip, integrated circuit, and/or physical component. For example, while the rectifier/regulator 146 is illustrated in the power supply block 140, the rectifier/regulator 146 can be implemented in a chip that also includes the logic elements of the controller 150 and/or other features of the embedded electronics in the body-mountable device 110. Thus, the DC supply voltage 141 that is provided to the controller 150 from the power supply 140 can be a supply voltage that is provided to components on a chip by rectifier and/or regulator components located on the same chip. That is, the functional blocks in FIG. 1 shown as the power supply block 140 and controller block 150 need not be implemented as physically separated modules. Moreover, one or more of the functional modules described in FIG. 1 can be implemented by separately packaged chips electrically connected to one another.

Additionally or alternatively, the energy harvesting antenna 142 and the communication antenna 170 can be implemented with the same physical antenna. For example, a loop antenna can both harvest incident radiation for power generation and communicate information via backscatter radiation.

The external reader 180 includes an antenna 188 (or a group of multiple antennas) to send and receive wireless signals 171 to and from the body-mountable device 110. The external reader 180 also includes a computing system with a processor 186 in communication with a memory 182. The memory 182 is a non-transitory computer-readable medium that can include, without limitation, magnetic disks, optical disks, organic memory, and/or any other volatile (e.g., RAM) or non-volatile (e.g., ROM) storage system readable by the processor 186. The memory 182 can include a data storage 183 to store indications of data, such as sensor readings (e.g., from the analyte bio-sensor 162 and/or light sensor 164), program settings (e.g., to adjust behavior of the body-mountable device 110 and/or external reader 180), etc. The memory 182 can also include program instructions 184 for execution by the processor 186 to cause the external reader 180 to perform processes specified by the instructions 184. For example, the program instructions 184 can cause external reader 180 to communicate with the body-mountable device 110. The program instructions 184 can also cause the external reader 180 to provide a user interface that allows for retrieving information communicated from the body-mountable device 110 (e.g., sensor outputs from the analyte bio-sensor 162 and/or light sensor 164). The external reader 180 can also include one or more hardware components for operating the antenna 188 to send and receive the wireless signals 171 to and from the body-mountable device 110. For example, oscillators, frequency injectors, encoders, decoders, amplifiers, filters, etc. can drive the antenna 188.

The external reader 180 can be a smart phone, digital assistant, or other portable computing device with wireless connectivity sufficient to provide the wireless communication link 171. The external reader 180 can also be implemented as an antenna module that can be plugged in to a portable computing device, such as in an example where the communication link 171 operates at carrier frequencies not commonly employed in portable computing devices. In some instances, the external reader 180 is a special-purpose device configured to be worn relatively near a wearer's eye to allow the wireless communication link 171 to operate with a low power budget. For example, the external reader 180 can be integrated in a piece of jewelry such as a necklace, earing, etc. or integrated in an article of clothing or an accessory worn near the head, such as a hat, headband, a scarf, a pair of eyeglasses, etc.

In some embodiments, the system 100 can operate to non-continuously ("intermittently") supply energy to the body-mountable device 110 to power the controller 150 and sensor electronics 160. For example, radio frequency radiation 171 can be supplied to power the body-mountable device 110 long enough to operate the sensor electronics 160 and communicate an outcome of such operation. In such an example, the supplied radio frequency radiation 171 can be considered an interrogation signal from the external reader 180 to the body-mountable device 110 to request feedback (e.g., a sensor measurement). By periodically interrogating the body-mountable device 110 (e.g., by supplying radio frequency radiation 171 to temporarily turn the device on), the external reader 180 can accumulate a set of measurements (or other feedback) over time from the sensor electronics 160 without continuously powering the body-mountable device 110.

Figure 2A:
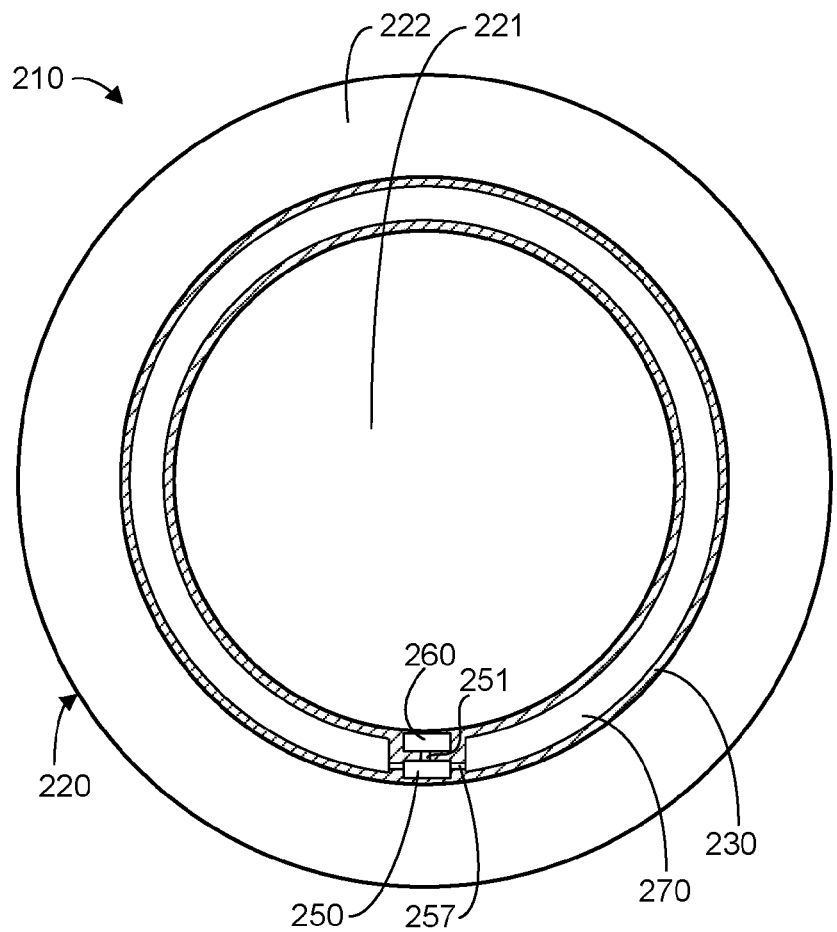
FIG. 2A is a top view of an example eye-mountable device.
Figure 2B:
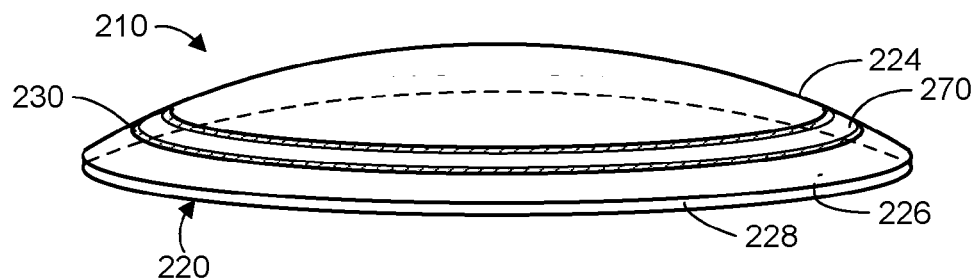
FIG. 2B is a side view of the example eye-mountable device shown in FIG. 2A.

FIG. 2A is a top view of an example eye-mountable electronic device 210 (or ophthalmic electronics platform). FIG. 2B is an aspect view of the example eye-mountable electronic device shown in FIG. 2A. It is noted that relative dimensions in FIGS. 2A and 2B are not necessarily to scale, but have been rendered for purposes of explanation only in describing the arrangement of the example eye-mountable electronic device 210. The eye-mountable device 210 is formed of a polymeric material 220 shaped as a curved disk. The polymeric material 220 can be a substantially transparent material to allow incident light to be transmitted to the eye while the eye-mountable device 210 is mounted to the eye. The polymeric material 220 can be a biocompatible material similar to those employed to form vision correction and/or cosmetic contact lenses in optometry, such as polyethylene terephthalate ("PET"), polymethyl methacrylate ("PMMA"), polyhydroxyethylmethacrylate ("polyHEMA"), silicone hydrogels, combinations of these, etc. The polymeric material 220 can be formed with one side having a concave surface 226 suitable to fit over a corneal surface of an eye. The opposite side of the disk can have a convex surface 224 that does not interfere with eyelid motion while the eye-mountable device 210 is mounted to the eye. A circular outer side edge 228 connects the concave surface 224 and convex surface 226.

The eye-mountable device 210 can have dimensions similar to a vision correction and/or cosmetic contact lenses, such as a diameter of approximately 1 centimeter, and a thickness of about 0.1 to about 0.5 millimeters. However, the diameter and thickness values are provided for example purposes only. In some embodiments, the dimensions of the eye-mountable device 210 can be selected according to the size and/or shape of the corneal surface of the wearer's eye and/or to accommodate one or more components embedded in the polymeric material 220.

The polymeric material 220 can be formed with a curved shape in a variety of ways. For example, techniques similar to those employed to form vision-correction contact lenses, such as heat molding, injection molding, spin casting, etc. can be employed to form the polymeric material 220. While the eye-mountable device 210 is mounted in an eye, the convex surface 224 faces outward to the ambient environment while the concave surface 226 faces inward, toward the corneal surface. The convex surface 224 can therefore be considered an outer, top surface of the eye-mountable device 210 whereas the concave surface 226 can be considered an inner, bottom surface. The "top" view shown in FIG. 2A is facing the convex surface 224 From the top view shown in FIG. 2A, the outer periphery 222, near the outer circumference of the curved disk is curved to extend into the page, whereas the central region 221, near the center of the disk is curved to extend out of the page.

A substrate 230 is embedded in the polymeric material 220. The substrate 230 can be embedded to be situated along the outer periphery 222 of the polymeric material 220, away from the central region 221. The substrate 230 does not interfere with vision because it is too close to the eye to be in focus and is positioned away from the central region 221 where incident light is transmitted to the eye-sensing portions of the eye. Moreover, the substrate 230 can be formed of a transparent material to further mitigate effects on visual perception.

The substrate 230 can be shaped as a flat, circular ring (e.g., a disk with a centered hole). The flat surface of the substrate 230 (e.g., along the radial width) is a platform for mounting electronics such as chips (e.g., via flip-chip mounting) and for patterning conductive materials (e.g., via microfabrication techniques such as photolithography, deposition, plating, etc.) to form electrodes, antenna(e), and/or interconnections. The substrate 230 and the polymeric material 220 can be approximately cylindrically symmetric about a common central axis. The substrate 230 can have, for example, a diameter of about 10 millimeters, a radial width of about 1 millimeter (e.g., an outer radius 1 millimeter greater than an inner radius), and a thickness of about 50 micrometers. However, these dimensions are provided for example purposes only, and in no way limit the present disclosure. The substrate 230 can be implemented in a variety of different form factors, similar to the discussion of the substrate 130 in connection with FIG. 1 above.

A loop antenna 270, controller 250, and sensor electronics 260 are disposed on the embedded substrate 230. The controller 250 can be a chip including logic elements configured to operate the sensor electronics 260 and the loop antenna 270. The controller 250 is electrically connected to the loop antenna 270 by interconnects 257 also situated on the substrate 230. Similarly, the controller 250 is electrically connected to the sensor electronics 260 by an interconnect 251. The interconnects 251, 257, the loop antenna 270, and any conductive electrodes (e.g., for an electrochemical analyte sensor, etc.) can be formed from conductive materials patterned on the substrate 230 by a process for precisely patterning such materials, such as deposition, photolithography, etc. The conductive materials patterned on the substrate 230 can be, for example, gold, platinum, palladium, titanium, carbon, aluminum, copper, silver, silver-chloride, conductors formed from noble materials, other metals, combinations of these, etc.

The loop antenna 270 is a layer of conductive material patterned along the flat surface of the substrate to form a flat conductive ring. In some examples, to allow additional flexibility along the curvature of the polymeric material, the loop antenna 270 can include multiple substantially concentric sections electrically joined together in parallel or in series. Each section can then flex independently along the concave/convex curvature of the eye-mountable device 210. In some examples, the loop antenna 270 can be formed without making a complete loop. For instances, the antenna 270 can have a cutout to allow room for the controller 250 and sensor electronics 260, as illustrated in FIG. 2A. However, the loop antenna 270 can also be arranged as a continuous strip of conductive material that wraps entirely around the flat surface of the substrate 230 one or more times. For example, a strip of conductive material with multiple windings can be patterned on the side of the substrate 230 opposite the controller 250 and sensor electronics 260. Interconnects between the ends of such a wound antenna (e.g., the antenna leads) can then be passed through the substrate 230 to the controller 250.

When the eye-mountable device 210 is mounted over a corneal surface of an eye, the motion of the eyelids distributes a tear film that coats both the concave and convex surfaces 224, 226. The tear film is an aqueous solution secreted by the lacrimal gland to protect and lubricate the eye. The tear film layers coating the eye-mountable device 210 can be about 10 micrometers in thickness and together account for about 10 microliters. The eye-mountable device 210 may allow for electrodes to be exposed to the tear film via a channel in the polymeric material, or perhaps the polymeric material may be configured to allow for diffusion of tear film analytes to such sensor electrodes. For example, the sensor electronics 260 may include one or more sensor electrodes of an amperometric analyte sensor, and a channel in the outward-facing convex surface 224 may expose the sensor electrodes to a layer of tear fluid coating the convex surface 224. The sensor electronics can then obtain an indication of an analyte concentration in the tear film by applying a voltage to the sensor electrodes and measuring a current through one or both of the sensor electrodes. A suitable reagent can be fixed in the vicinity of the sensor electrodes to facilitate an electrochemical reaction with a desired analyte. As the analyte is consumed by such electrochemical reactions, additional analyte diffuses to the sensor, and the rate of re-supply (i.e., the rate at which the analyte diffuses to the sensor) is related to the analyte concentration. The measured amperometric current, which is related to the electrochemical reaction rate, is therefore indicative of the analyte concentration in the tear film.

III. Example Antenna Impedance Tuning System

Figure 3:
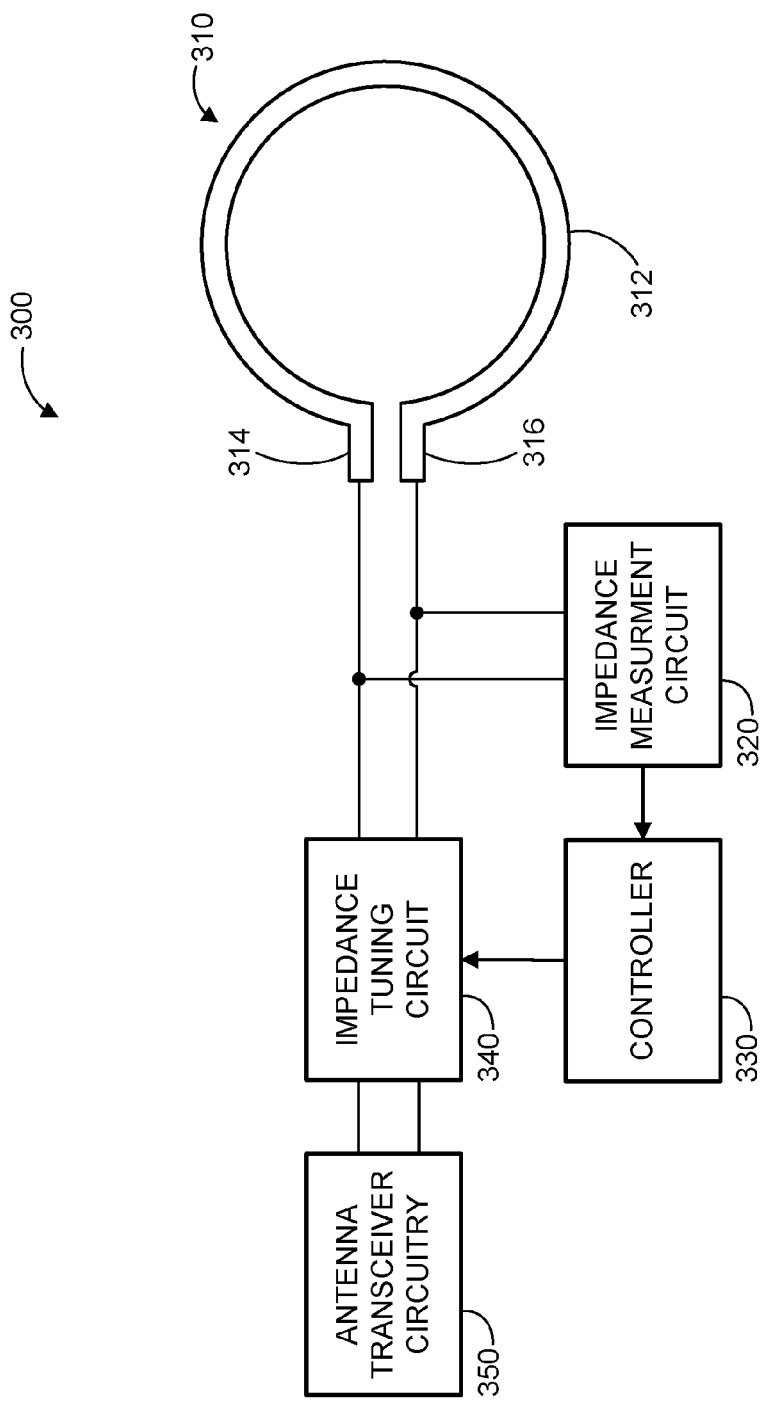
FIG. 3 is a functional block diagram of an example system configured to adjust for temporal variations in antenna impedance.

FIG. 3 is a functional block diagram of an example system 300 configured to adjust for temporal variations in antenna impedance. The system 300 includes the antenna 310, an impedance measurement circuit 320, a controller 330, an impedance tuning circuit 340, and a transceiver 350. The measurement circuit 320 is electrically connected to the antenna 310 and functions to obtain a measurement indicative of the impedance of the antenna 310. The controller 330 is in communication with the measurement circuit 320 and the tuning circuit 340. The controller 330 receives the measurement from the measurement circuit 320, and determines whether and how to adjust the tuning circuit 340 to cause the antenna 310 to be connected to a conjugate matched impedance. The controller 330 then instructs the tuning circuit 340 to make the determined adjustment. The transceiver 350 is electrically connected to the antenna 310 through the tuning circuit 340. By iteratively adjusting the tuning circuit 340 in accordance with the measured impedance of the antenna 310 (as measured by the measurement circuit 320), the controller 330 can cause the antenna-connected circuit components (e.g., the tuning circuit 340 and the transceiver 350) to be conjugate matched to the antenna 310.

The antenna 310 can take a variety of different forms in different applications. The antenna 310 is a radiator with a body 312 formed of a conductive material that connects with the measurement circuit 320 and tuning circuit 340 via respective antenna leads 314, 316, which may be integrally formed with the body 312. As shown in FIG. 3, the antenna 310 may be a loop antenna, and may be similar in some respects to the antennas in body-mountable devices 100, 200 described above in connection with FIGS. 1 and 2. For example, the antenna 310 may be formed by electroplated conductive material arranged in a loop. A loop antenna may be favorable in wireless power transfer applications, for example. Moreover, while the antenna 310 is described as a radiator, in some examples the antenna 310 may be used in near field applications and function primarily reactively.

The impedance measurement circuit 320 functions to obtain a measurement indicative of the impedance of the antenna 310. In some examples, the measurement circuit 320 may include a current source and a voltage sensor. The current source can convey a test current through the antenna while the voltage sensor measures the voltage across the antenna 310 to sample the resulting waveform. For example, a voltage sensor may be implemented by an amplifier connected across the antenna leads 314, 316. In some examples, the test current may also be measured using a current mirror, which may be implemented using an active device that generates a replica current proportionate to the test current to allow for measurement without loading the antenna 310. In one example, a current mirror may be implemented by conveying the test current through a diode connected transistor, and then setting a base voltage (or gate voltage, etc.) of a "mirror" transistor based on a voltage that develops on the diode connected transistor. Other implementations are also possible to generate a replica current for measurement purposes. The measurement circuit 320 may also include a transimpedance amplifier for converting the replica current to voltage values for measurement purposes. Thus, a transimpedance amplifier may be connected across the current mirror and provide voltage values to the controller 330 for measurement.

The controller 330 can be digital control module implemented by hardware logic to perform the functions described herein. The controller 330 can receive indications of the measurements performed by the measurement circuit 320, and use those measurements to determine adjustments to the tuning circuit 340. The controller 330 may include or be associated with an analog-to-digital converter for converting voltage values from the measurement circuit 320 to digital values for further processing by the controller 330. For example, the voltage sensor in the measurement circuit 320 may provide a voltage waveform to the analog-to-digital converter indicative of the measured voltage across the antenna leads 314, 316 while the test current is being conveyed through the antenna 310. In some examples, the analog-to-digital converter may also receive a voltage waveform from the transimpedance amplifier indicating the replica current (and thus the test current) from the measurement circuit 320. The analog-to-digital converter can then sample the waveforms at a sampling frequency that depends on the frequency of the test current signal. In some cases, a multiplexer can be used to select between the transimpedance amplifier and from the voltage sensor to enable sampling from each via the same analog-to-digital converter.

The controller 330 can then use the obtained measurements of the voltage across the antenna 310, and the current conveyed through the antenna 310 to extract the impedance of the antenna 310. In practice, the impedance may be estimated using the relationship: $Z=V/I$, with $Z$ the impedance, $V$ the measured voltage, and $I$ the test current. The signal may also be processed using I, Q down-conversion to separate orthogonal components of the voltage and/or current waveforms (e.g., real and imaginary components). However, at least in some examples, the antenna 310 is not isolated from the tuning circuit 340 and transceiver 350 during the measurements, and so the impedance estimated using the current and voltage measurements is the impedance of the antenna 310 connected to the tuning circuit 340 and transceiver 350. In another example, an additional switch (or switches) may be used to isolate the antenna 310 from the tuning circuit 340 during measurement. Such switches may be situated between the tuning circuit 340 and the connection of the measurement circuit 320.

In examples in which the estimated impedance includes the tuning circuit 340 and transceiver 350, the controller 330 can further determine the impedance exhibited by the antenna 310. For example, the controller 330 may be calibrated or otherwise configured with information indicative of the impedance of the transceiver 350. In addition, the controller 330 may associate a particular impedance with the tuning circuit 340 based on the current configuration thereof (e.g., the particular arrangement of reactive components connected to the antenna 310). In examples in which the transceiver 350 is implemented by an integrated circuit, the transceiver impedance remains substantially stable over time and in various environmental conditions. In practice, the controller 330 can therefore associate a fixed impedance with the transceiver 350 and a configuration-dependent impedance with the tuning circuit 340. The controller 330 can then determine the antenna impedance from the impedance estimated based on the measurements by accounting for the two "known" impedances (of the transceiver 350 and tuning circuit 340) and determining the impedance attributable to the antenna 310.

Upon determining the antenna impedance, the controller 330 can then determine an adjustment to the tuning circuit 340 based on the determined antenna impedance, and instruct the tuning circuit 340 to make the adjustment. For example, the controller 330 may determine a particular arrangement of the selectively connected reactive elements in the tuning circuit 340 and then provide suitable control signals to effect the arrangement sought in the tuning circuit 340. For example, the antenna impedance may be determined to be $Z_{ANT} = R_{ANT}$ j $X_{ANT}$, with $R_{ANT}$ the resistive component, and $X_{ANT}$ the reactive component. The target impedance $Z_{TARGET}$ of the combined tuning circuit 340 and transceiver 350 is then $Z_{TARGET} = R_{ANT}$ j $X_{ANT}$, and so the adjustments (if any) to the tuning circuit 340 are selected to cause the tuning circuit 340 and transceiver 350 to approach the target impedance $Z_{TARGET}$.

The adjustment to the tuning circuit 340 may cause the combined tuning circuit 340 and transceiver 350 to have an impedance that is the complex conjugate of the determined antenna impedance (i.e., conjugate matched). In such a configuration the power transfer between transmitted/received radiation and the transceiver 350 is maximized. As a result, energy harvesting electronics operate with additional power, and communication electronics operate with greater signal margins and/or data rates. In some examples, the adjustment to the tuning circuit 340 may be configured to account for the reactive component of the measured impedance, but not the resistive component. Such an approach may be well-suited to applications in which the variability of the antenna impedance is more susceptible to variations in the reactive component than the resistive component.

In some examples, the test current is a signal with a frequency band near about 915 megahertz (MHz), although other frequency bands may be selected, such as 13 MHz, 2.4 gigahertz (GHz), etc. In some cases, samples of the measured voltage(s) are obtained for a duration that spans approximately 10 cycles of the signal waveform, although a variety of different sampling durations may be used.

The impedance tuning circuit 340 includes one or more reactive components that can be selectively connected to the antenna 310 (i.e., to one or both of the leads 314, 316). In some examples, the tuning circuit 340 may include a shunt capacitor configured to be connected between the antenna leads 314, 316 via a switch. Additionally or alternatively, the tuning circuit 340 may include a shunt inductor configured to be connected between the antenna leads 314, 316 via another switch. Additionally or alternatively, the tuning circuit 340 may include a series capacitor configured to be connected to one of the antenna leads 314, 316 via another switch (or pair of switches). Additionally or alternatively, the tuning circuit 340 may include a series inductor configured to be connected to one of the antenna leads 314, 316 via another switch (or pair of switches). Moreover, the tuning circuit 340 may include multiple capacitors with different values that can be selectively connected in parallel (via respective switches) to provide a total target shunt and/or series capacitance. And similarly, the tuning circuit 340 may include multiple inductors with different values that can be selectively connected (via respective switches) to provide a total desired shunt and/or series inductance. The various switches that connect the reactive components in the impedance tuning circuit 340 may be implemented by transistors that operate in accordance with control signals from the controller 330. Using the switches, the controller 330 can selectively connect and/or disconnect the reactive components to/from the antenna 310 so as to make the desired impedance adjustment.

Additionally or alternatively, the impedance tuning circuit 340 may include one or more reactive components with reactances that can be adjusted via the controller 330. For example, the impedance tuning circuit 340 may include a reactive component with a capacitance and/or inductance that depends on an applied voltage, and the controller 330 may regulate the reactance by adjusting the voltage applied to such a component. In some examples, such a variable capacitor (e.g., a varactor) may be connected to one or both leads 314, 316 of the antenna 310. Other examples of adjustable reactive components included in the impedance tuning circuit 340 and regulated by the controller 330 so as to create an impedance that is conjugate matched to the antenna 310 are also possible.

The transceiver 350 may be implemented in a number of different ways. The transceiver 350 may include communication circuitry configured to send and receive wireless communications using the antenna by modulating phase, frequency, and/or amplitude of carrier signals so as to encode data. In some examples, the transceiver 350 can additionally or alternatively include energy harvesting circuitry, such as a rectifier and regulator, which power electronics components, similar to the description of energy harvesting systems described above in connection with the body-mountable devices 110, 210 of FIGS. 1 and 2.

In an example operation, the controller 330 can function to cause the antenna 310 to be connected to a conjugate matched impedance, even as the impedance of the antenna 310 undergoes variations, by making real time adjustments to the impedance tuning circuit 340 in a manner that accounts for those variations. The system 300 may be used in an environment with conditions that lead to temporal variations in antenna impedance (e.g., variations in dielectric loading, temperature, humidity, etc.). For example, the system 300 may be included in a body-mountable device, such as the body-mountable devices 110, 210 discussed above in connection with FIGS. 1 and 2. Thus, in some examples, the system 300 may be situated on a substrate embedded within a biocompatible polymeric material, which may be formed to include a body-mountable surface.

Figure 4A:
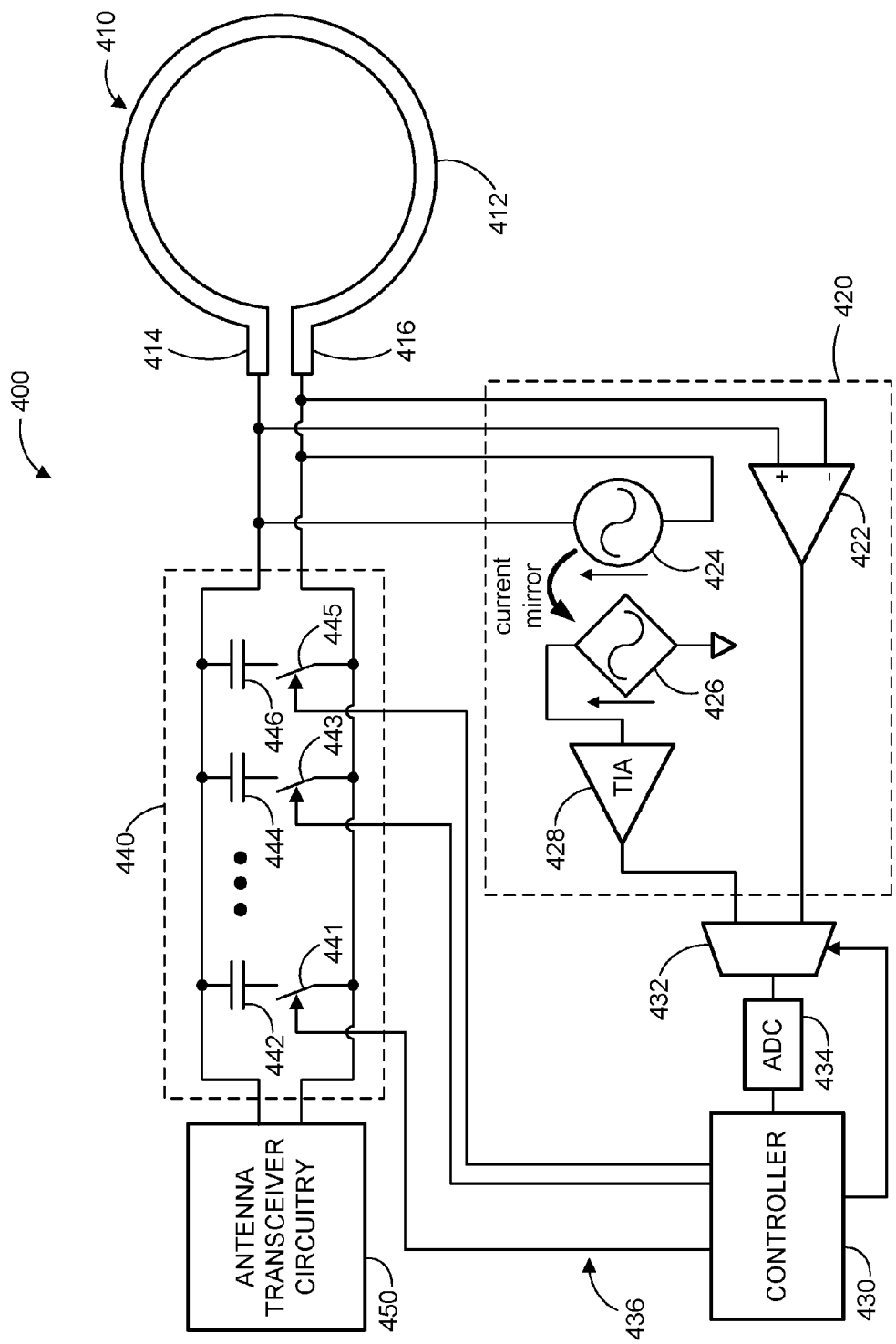
FIG. 4A is a functional block diagram of an example system configured to adjust for temporal variations in antenna impedance.

FIG. 4A is a functional block diagram of an example system 400 configured to adjust for temporal variations in antenna impedance. The system 400 is similar in some respects to the system 300 described in connection with FIG. 3 and may be considered an example implementation of the system 300. The system 400 includes an antenna 410, an impedance measurement circuit 420, a controller 430, an impedance tuning circuit 440, and a transceiver 450. The antenna 410 includes a conductive radiative body 412, which may be configured as a loop, and antenna leads 414, 416 through which the antenna 410 connects to the remaining circuit components.

The impedance measurement circuit 420 includes a current source 424 connected to convey a test current through the antenna 410. A current mirror 426 generates a replica current based on the test current. The replica current from the current mirror 426 provides a current that can be sampled for measurement without electrically loading the antenna 410. To facilitate such measurements, the current mirror 426 is connected to a transimpedance amplifier 428, which outputs a voltage that depends on the replica current and thus converts the replica current to a voltage signal that can be measured. The current mirror 426 may be implemented by a range of different technologies based on the desired frequency response, size/power limitations, etc. The measurement circuit 420 also includes a voltage sensor 422, which may be an amplifier connected across the antenna leads 414, 416.

Both the output of the voltage sensor 422 and the output of the transimpedance amplifier 428 are connected to inputs of a multiplexer 432, which selects one of the voltage signals to provide to an analog-to-digital converter (ADC) 434 based on instructions from the controller 430. Thus, the controller 430 can instruct the multiplexer 432 to select one of the measurement sources (i.e., the transimpedance amplifier 428 or the voltage sensor 422), which causes the ADC 434 to sample the selected voltage source. The controller 430 can then receive a series of digital values from the ADC 434 as the ADC samples 434 the incoming voltage waveform. The controller 430 can then analyze the waveform(s) of the test current conveyed through the antenna 410 (from the transimpedance amplifier 428) and the resulting voltage across the antenna 410 (from the voltage sensor 422), and determine the antenna impedance. Similar to the description of controller 330 provided above in connection with FIG. 3, the controller 430 determining the antenna impedance may involve associating a fixed impedance with the transceiver 450 and a configuration-dependent impedance with the tuning circuit 440 (the "known" impedances). The controller 430 may then determine the impedance to attribute to the antenna 410 based on the impedance derived from the series of measurements by accounting for the two "known" impedances.

The controller can then determine an adjustment to the tuning circuit 440 that matches the determined antenna impedance. The controller 430 can cause the tuning circuit 440 to make the determined adjustment by providing suitable control signals 436 to switches in the tuning circuit 440 that cause reactive elements therein to be connected to the antenna 410. As shown in FIG. 4A, the tuning circuit 440 includes multiple shunt capacitors 442, 444, 446 each arranged to be connected across the antenna leads 414, 416 by a respective switch 441, 443, 445, which all operate in accordance with the signals 436 from the controller 430. Each of the capacitors 442, 444, 446 may have a different value such that connecting different combinations can provide a different total shunt capacitance, and thus a different impedance adjustment. In one example, capacitor 446 may have the least capacitance C, and capacitor 444 may have a capacitance of 2 C, and each additional capacitor can have a capacitance that is double the next-smallest one. Capacitor 442 may have a capacitance of $2^{N-1}$ C, with N the total number of shunt capacitors in the tuning circuit 440. Selectively connecting such a bank of capacitors in different combinations can allow for the total shunt capacitance to be selected in increments of C. Other arrangements of selectively connected reactive elements in shunt and/or series arrangements are also possible as noted above in connection with FIG. 3.

Figure 4B:
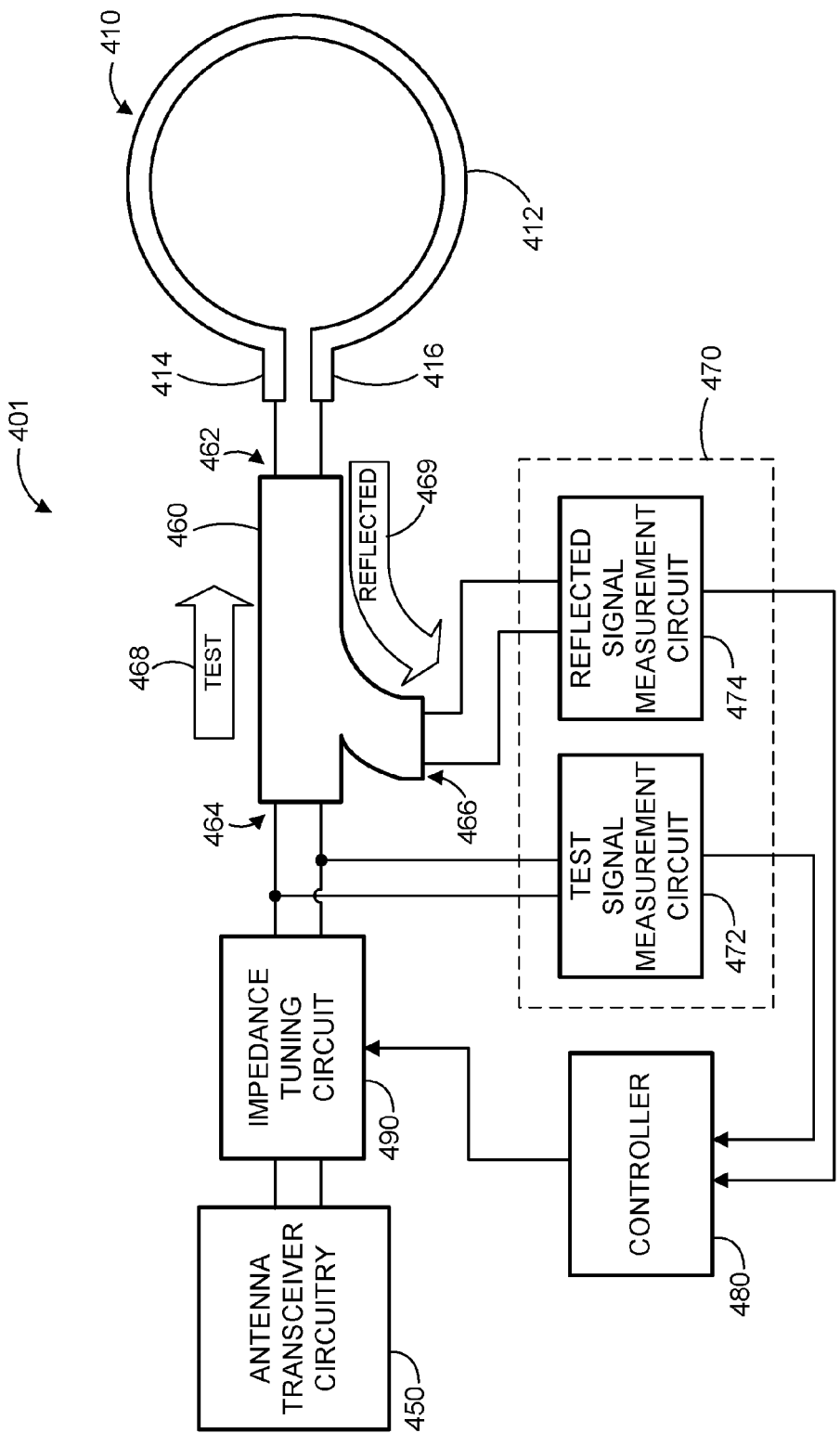
FIG. 4B is a functional block diagram of an example system configured to adjust for temporal variations in antenna impedance.

FIG. 4B is a functional block diagram of an example system 401 configured to adjust for temporal variations in antenna impedance. The system 401 is similar in some respects to the system 300 described in connection with FIG. 3 and may be considered an example implementation of the system 300. In addition to the antenna 410 and the transceiver 450, which have been described above in connection with FIG. 4A, the system 401 includes a directional coupler 460, an impedance measurement circuit 470, a controller 480, and an impedance tuning circuit 490. The system 401 functions to obtain a measurement of the antenna impedance using the impedance measurement circuit 470, determine an adjustment to the impedance tuning circuit 490 via the controller 480, and cause the impedance tuning circuit 490 to make the determined adjustment. However, unlike the system 400 described in connection with FIG. 4A, the system 401 obtains a measurement of the antenna impedance by measuring both a test signal applied to the antenna 410 and a reflected signal returning from the antenna 410, and then determining the antenna impedance using both measurements and a reference impedance.

The directional coupler 460 is a three port device that conveys signals between an input port 462 and a transmitted port 464 and a coupled port 466. In practice, signals received at the input port 462 are divided between both the transmitted port 464 and the coupled port 466, with the relative power allocated to each based on the configuration of the directional coupler 460. In addition, signals received at the transmitted port 464 are conveyed to the input port 462. However, the coupled port 466 and the transmitted port 464 are substantially isolated from one another, and so signals input to the transmitted port 464 are not conveyed to the coupled port 466 or vice versa. Thus, the directional coupler 460 functions to cause signals originating at the antenna transceiver 450 and passing through the impedance tuning circuit 490 to reach through the antenna 410 (e.g., by entering the transmitted port 464 and exiting the input port 462). Whereas signals from the antenna 410 (e.g., due to received radiated energy and/or reflected energy from signals applied to the antenna 410) enter the input port 462 and are conveyed both to the transceiver 450 (via transmitted port 464) and also to the impedance measurement circuit 470 (via coupled port 466). It is noted that in some embodiments, the directional coupler 460 may be implemented as a four-port device, such as a microwave waveguide that is substantially symmetrical. For example, a second coupled port may receive a portion of signals input to the transmitted port 464, and may be substantially isolated from the input port 462. In some embodiments, such an additional coupled port may be terminated by a resistor so as to absorb any incoming signals and dampen any reflections from returning into the coupler 460.

The impedance measurement circuit 470 includes a test signal measurement circuit 472 and a reflected signal measurement circuit 474. The test signal measurement circuit 472 is configured to measure a signal strength (e.g., a measurement of voltage and/or current magnitude) of a test signal applied to the antenna 410 (e.g., a test signal from the transceiver 450 conveyed via the impedance tuning circuit 490). Thus, the test signal measurement circuit 472 can be electrically coupled between the impedance tuning circuit 490 and the transmitted port 464 of the directional coupler 460. The reflected signal measurement circuit 474 is configured to measure a signal strength (e.g., a measurement of voltage and/or current magnitude) of a reflected signal returning from the antenna 410 (e.g., a reflected signal from the antenna 410 that results from the application of the test signal). Thus, the reflected signal measurement circuit 474 can be electrically coupled to the coupled port 466 of the directional coupler 460 so as to receive at least a portion of signals coming from the antenna 410. Each of the measurement circuits 472, 474 may include voltage sensors such as an amplifier that outputs a signal, such as a voltage value, to the controller 480, which can then analyze the measurements digitally via an analog to digital converter. To facilitate understanding, the path of the applied test signal through the directional coupler 460 (i.e., from the transmitted port 464 to the input port 462) is indicated by a directional arrow 468 labeled "TEST." Similarly, the path of the reflected signal through the directional coupler 460 (i.e., from the input port 462 to the coupled port 466) is indicated by a directional arrow 469 labeled "REFLECTED."

The controller 480 receives measurements from both the test signal measurement circuit 472 and reflected signal measurement circuit 474, and uses those measurements in combination with a predetermined characteristic impedance of the directional coupler 460 to determine the impedance of the antenna 410. In some examples, the controller 480 may determine the antenna impedance by first determining the reflection coefficient, Γ, of the antenna 410 and directional coupler 460 considered together, and then solving for the antenna impedance. The reflection coefficient Γ may be determined from the obtained measurements of the magnitudes of the applied test signal and the reflected signal, as indicated by the relationship below, in which |Vtest| is the magnitude of the voltage of the applied test signal, |Vreflected| is the magnitude of the voltage of the reflected signal, Zant is the impedance of the antenna 410, and Zcoupler is the characteristic impedance of the directional coupler 460.

$$\Gamma = \frac{|Vreflected|}{|Vtest|} = \frac{Zant - Zcoupler}{Zant + Zcoupler}$$

Thus, to determine the antenna impedance, Zant, the controller 480 can obtain measurements of |Vtest| and |Vreflected| (from the test signal measurement circuit 472 and reflected signal measurement circuit 474, respectively), calculate Γ, and then solve the relation for Zant using a predetermined value for Zcoupler. Once the controller 480 determines the antenna impedance (i.e., Zant), the controller 480 can then determine an appropriate adjustment to the impedance tuning circuit 490 that will cause the antenna 410 to be coupled to a conjugate matched impedance, similar to the discussion of the controller 430 described above in connection with FIG. 4A.

In some examples, the electrical connections between the directional coupler 460, the antenna 410, and the impedance measurement circuit 470 may use shielded connections such that the impedance of those connections are not influenced by dielectric loading in the vicinity of the system 401. As such, the system 401 can function to obtain a measurement of the impedance of the antenna 410, which may be due to variations in dielectric loading, temperature, and/or other factors that change over time.

The impedance tuning circuit 490 can include one or more reactive components that can be selectively connected to the antenna 410 (via the directional coupler 460) and/or that have an adjustable impedance value such that the reactive components can be used to adjust the impedance coupled to the antenna 410. Thus, the impedance tuning circuit 490 may include a combination of series connected and/or shunt connected inductors and/or capacitors spanning a range of values that can each be selectively connected to the antenna 410 according to control signals from the controller 480. Further, the impedance tuning circuit 490 may include one or more variable impedance components, such as a varactor or a similar component that can adjust its impedance based on an input signal regulated by the controller 480. Of course, other arrangements of selectively connected reactive elements in shunt and/or series arrangements are also possible as noted above in connection with FIG. 3.

IV. Example Reader and Eye-Mountable Device System

Figure 5A:
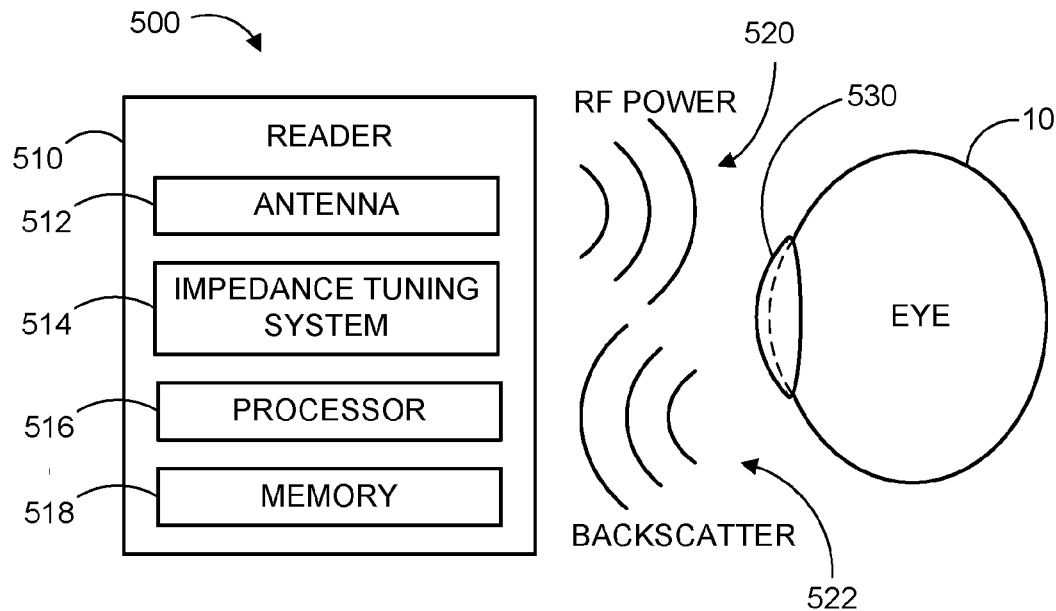
FIG. 5A is a block diagram of an example system with an eye-mountable device and an external reader.
Figure 5B:
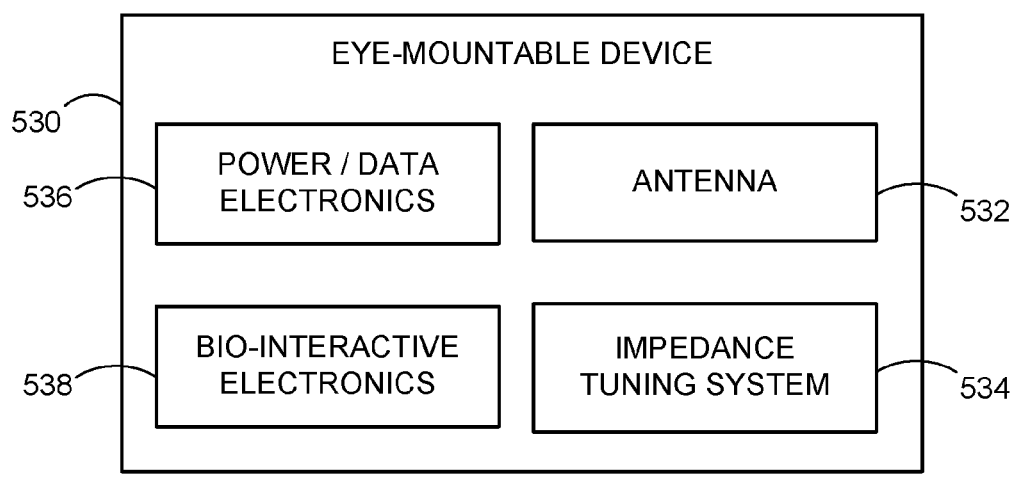
FIG. 5B is a block diagram of the eye-mountable device shown in FIG. 5A.

FIG. 5A is a block diagram of a system 500 with an eye-mountable device 530 and an external reader 510. FIG. 5B is a block diagram of the eye-mountable device 530 shown in FIG. 5A. The eye-mountable device 530 is configured to be contact-mounted over a corneal surface of an eye 10.

The eye-mountable device 530 includes a communication system and/or energy harvesting system with an antenna 532 and an impedance tuning system 534, similar to the impedance tuning systems described herein in connection with FIGS. 1-4. Thus, the impedance tuning system 534 can function to obtain measurements indicating the impedance of antenna 532, and selectively connect reactive components to the antenna 532 so as to increase power transfer to/from the antenna 532 (e.g., by connecting the antenna 532 with an impedance matched circuit). The eye-mountable device 530 also includes power/data electronics 536 which are electrically connected to the antenna 532 through the impedance tuning system 534. The power/data electronics 536 may harvest energy from incident radiation 520 received at the antenna 532 and provide power to bio-interactive electronics 538. The bio-interactive electronics 538 may perform a variety of functions such as measuring an analyte concentration. In some cases, the power/data electronics 536 can use the antenna 532 to communicate information from the bio-interactive electronics 538 (e.g., a sensor measurement) to the reader 510 via backscatter radiation 522.

The external reader 510 includes an antenna 512 and an impedance tuning system 514, similar to the impedance tuning systems described herein in connection with FIGS. 1-4. Thus, the impedance tuning system 514 can function to obtain measurements indicating the impedance of antenna 512, and selectively connect reactive components to the antenna 512 so as to increase power transfer to/from the antenna 512 (e.g., by connecting the antenna 512 with a conjugate matched circuit). The external reader 510 can also include a processing system 516 and a memory 518. The processing system 516 can be a computing system that executes software stored in the memory 518 to cause the system 500 to operate as described herein to obtain information from the eye-mountable device (e.g., sensor measurements obtained using the bio-interactive electronics 538). In practice, the reader 510 may query the eye-mountable device 530 by intermittently transmitting radio frequency 520 to power the eye-mountable device 530, and then receive an indication of a measurement in backscatter radiation 522.

By including impedance tuning systems both in the eye-mountable device 530 and the external reader 510, the wireless link for both power transfer and data transfer is improved from both sides. The reader 510 may be incorporated into a head-mountable system, an article of clothing or jewelry, or another article configured to be worn near a user's eye or head. In one example, which is illustrated further by FIGS. 6A-6C, the reader may be integrated into an eyeglasses frame configured to be worn on a user's face.

Figure 6A:
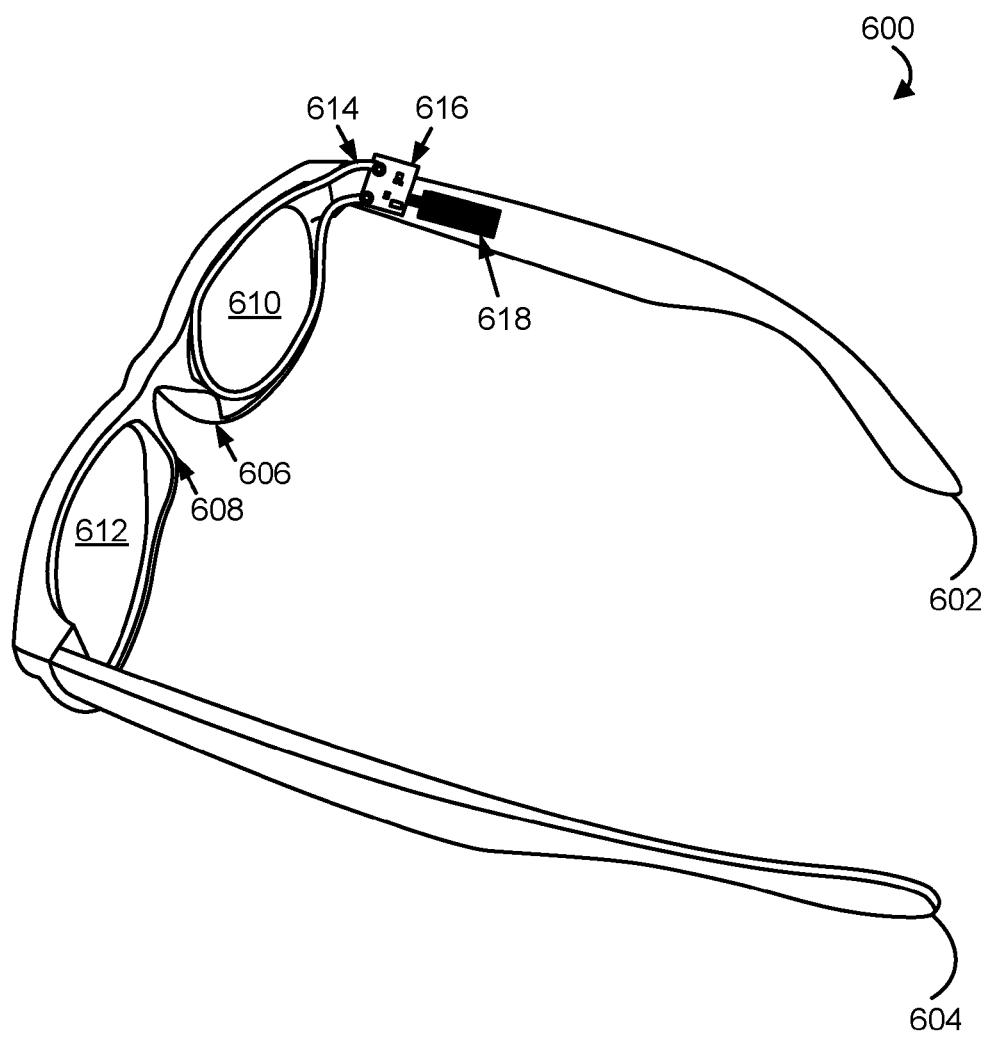
FIG. 6A illustrates an example head-mountable eyeglass frame, according to an example embodiment.

FIG. 6A illustrates an example head-mountable eyeglass frame 600. The eyeglass frame 600 includes end pieces 602-604, pads 606-608, and eyepiece sections 610-612. A loop antenna 614 is disposed along a periphery of the eyepiece section 610. The eyeglass frame 600 also includes impedance tuning circuitry 616 and a power supply 618, and processing system.

The end pieces 602-604 can be formed from any material (e.g., plastic, metal, composite material, etc.) suitable for supporting the components of the eyeglass frame 600. In some examples, the end pieces 602-604 can be shaped to correspond with a wearer's ears such that the eyeglass frame 300 can be comfortably mounted to the wearer's head. Additionally, the pads 606-608 can be formed from similar materials suitable for supporting the eyeglass frame 600 and the included components and shaped to mount on the wearer's nose.

Although not illustrated in FIG. 6A, in some examples, the arrangement of the eyeglass frame 600 can omit the end pieces 602-604 and/or the pads 606-608. For example, the eyeglass frame 600 can be implemented without the end pieces 602-604. In this example, the pads 606-608 can support the eyepiece sections 610-612 and other components of the eyeglass frame 600 when the eyeglass frame 600 is mounted to the head. In examples, the eyepiece sections 610-612 can be supported by an elastic band or other means.

The eyepiece sections 610-612 can be shaped to allow an environment of the wearer to be viewable through a central area of the eyepiece sections 610-612. For example, the eyepiece section 610 may support a transparent material such as a lens or other optical element in the central area such that the environment is viewable through the central area. Alternatively, the transparent material may be omitted such that the central area of the eyepiece sections 610-612 allows light propagating towards the wearer's eye to travel through the central area.

The loop antenna 614 is disposed along a periphery of the eyepiece section 610 such that the loop antenna 614 does not obstruct the view of the wearer when the eyeglass frame 600 is mounted to the wearer's head. In some examples, the loop antenna 614 can be implemented as a wire of conductive material that is shaped in accordance with a shape of the periphery of the eyepiece section 610 as illustrated in FIG. 6A. In some examples, the loop antenna 614 can be at least partially embedded in the periphery of the eyepiece section 610. Moreover, the loop antenna 614 can include multiple loops wound along the periphery of the eyepiece section 614 in parallel and/or coiled in series.

The loop antenna 614 can be configured to receive an electric current and transmit electromagnetic energy. In some examples, a link efficiency of the loop antenna 614 (or "link gain") can be based, at least in part, on the transmission frequency of the loop antenna 614. In one example, if the transmission frequency corresponds to a resonant frequency of the loop antenna, the link efficiency can be increased.

Thus, in this example, a high portion of the energy in the input electric current can be converted to the electromagnetic energy. Additionally or alternatively, the link efficiency of the loop antenna 614 can be improved by impedance matching between the loop antenna 614 and the input signal from the power supply 618.

To facilitate adjusting the resonant frequency of the loop antenna 614 or the input impedance of the loop antenna 614, the eyeglass frame 600 can optionally include the tuning circuitry 616. The tuning circuitry 616 can include reactive tuning components, such as inductors and capacitors, arranged to adjust the input impedance of the loop antenna 614 and/or tune the resonant frequency of the loop antenna 614, similar to the description of impedance tuning systems above. In some examples, the tuning circuitry 316 can include suitable devices (e.g., inductors, capacitors, etc.) arranged to modify the resonance frequency of the loop antenna 314 (e.g., LC tuning).

Figure 6B:
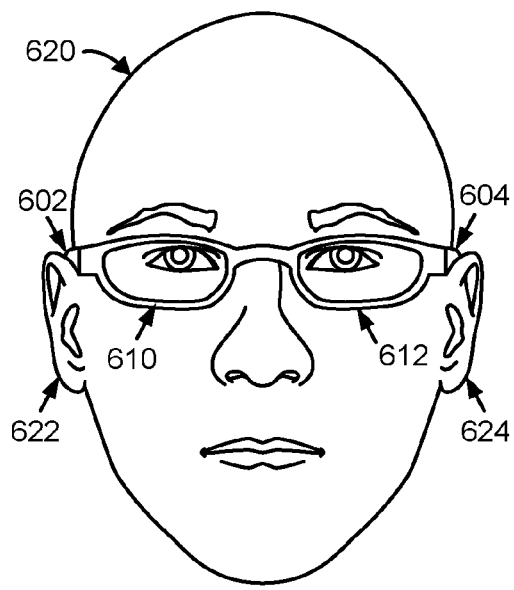
FIG. 6B illustrates the example head-mountable eyeglass frame of FIG. 6A in a head-mounted configuration.

FIG. 6B illustrates the head-mountable eyeglass frame 600 of FIG. 6A mounted to a head 620. As illustrated in FIG. 6B, the end pieces 602-604 are mounted, respectively, on ears 622-624 to support the eyeglass frame 600 on the wearer's head 620. So worn, the wearer is able to view the surrounding environment through the eyepiece sections 610, 612.

Figure 6C:
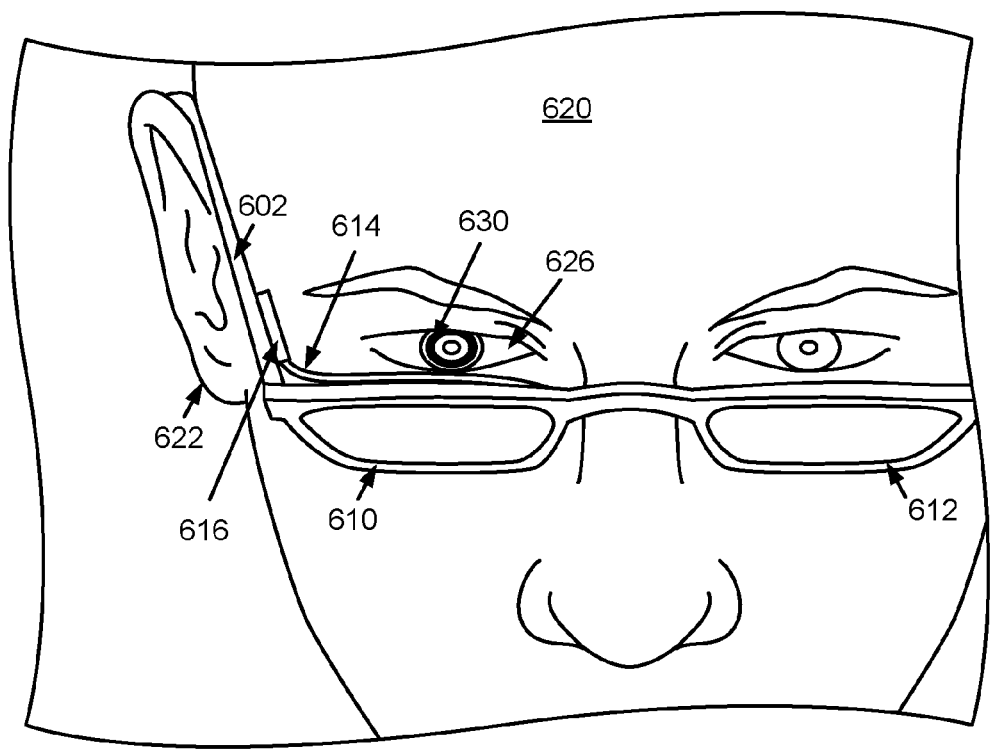
FIG. 6C is a close-in view of FIG. 6B enhanced to show an example eye-mountable device mounted on a cornea and the loop antenna disposed on the example head-mountable eyeglass frame.

FIG. 6C is a close-in view enhanced to show an eye-mountable device 630 mounted on a cornea 626 and the loop antenna 614 disposed on the head-mountable eyeglass frame 600 of FIGS. 6A-6B. The structure and function of the eye-mountable device 630 can be similar to the eye-mountable device 110 in FIG. 1 and the eye-mountable device 210 in FIGS. 2A-2B, and the eye-mountable device 530 in FIGS. 5A-5B. For example, the eye-mountable 630 may include electronic components suitable for wirelessly communicating with the loop antenna 614 and for harvesting power from electromagnetic energy transmitted by the loop antenna 614.

As illustrated in FIG. 6C, when the eyeglass frame 600 is mounted to the head 620, the loop antenna 614 is at a short distance from the eye-mountable device 630. Thus, for example, if the short distance is within a near-field of the loop antenna 614, a reactive component of the electromagnetic energy transmitted by the loop antenna can be harvested by the eye-mountable device 630. Further, for example, a radiative component of the electromagnetic energy (e.g., RF radiation) can also be harvested with a small loss due to the short distance. Additionally, relative motion between the loop antenna 614 and the eye-mountable device 630 is minimal as the head 620 moves. Thus, a high efficiency and low variability of power transfer from the loop antenna 614 to the eye-mountable device 630 may be realized in the illustrated embodiment.

In addition, as the impedance of the loop antenna 614 changes over time, those changes can be accounted for using the impedance tuning circuitry 616. Such changes in impedance of the loop antenna 614 may occur, for example, due to changes in the dielectric loading from the wearer's head 620 (e.g., due to changes in position on the wearer's head 620, changing distributions of perspiration and/or tear fluid, etc.). Similarly, as the impedance of the antenna within the eye-mountable device 630 changes over time, those changes can be accounted for using the impedance tuning circuitry included in the eye-mountable device 630. Such changes in the impedance of the antenna in the eye-mountable device 630 may occur, for example, due to changes in the dielectric loading from the wearer's cornea 626 (e.g., due to changes in position on the corneal surface, variable corneal thickness, changes in tear fluid distribution, etc.). As a result, wireless power provided to the eye-mountable device 630, from the eyeglass frame 600 is transmitted at a relatively high efficiency from the loop antenna 614. And that radiation is received at the eye-mountable device 630 by its loop antenna, and the power is transferred to the energy harvesting systems therein, with a relatively high efficiency.

V. Example Operations

Figure 7A:
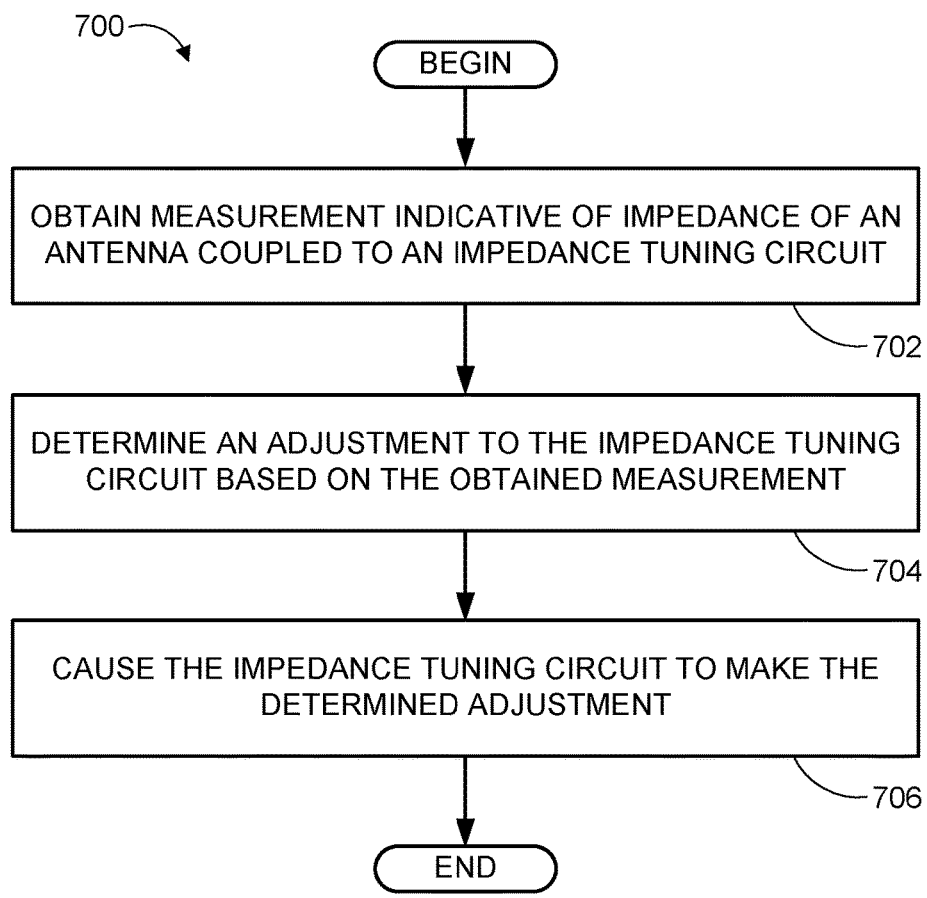
FIG. 7A is a flowchart of an example process involving adjusting an impedance tuning circuit based on a real time measurement of the impedance of an antenna.

FIG. 7A is a flowchart of an example process 700 involving adjusting an impedance tuning circuit based on a real time measurement of the impedance of an antenna. The process 700 may be performed using any of the impedance tuning systems described herein in connection with FIGS. 1-6. For example purposes, some functions in process 700 are described in connection with the system 300 of FIG. 3.

At block 702, an impedance measurement circuit is used to obtain a measurement indicative of an impedance of an antenna that is coupled to an impedance tuning circuit. For example, the impedance measurement circuit 320 may convey a test current through antenna 310, and measure the voltage across the antenna 310 while the test current is being conveyed. The measured voltage, in combination with the test current, can then be used to estimate the antenna impedance. In some examples, the obtained measurement may also include a measurement of the test current. The measurement(s) can then be provided to the controller 330, (e.g., via an analog-to-digital converter) for processing.

At block 704, a controller determines an adjustment to the impedance tuning circuit based on the obtained measurement. For example, the controller 330 can determine the impedance of the antenna 310, and then determine a particular arrangement with which to connect reactive elements in the tuning circuit 340 such that the antenna 310 is matched to its complex conjugate impedance. As describe above, the controller 310 determining the adjustment may involve accounting for a fixed impedance associated with transceiver and/or energy harvesting components and may involve accounting for a configuration-dependent impedance associated with the tuning circuit 320.

At block 706, the controller can cause the impedance tuning circuit to make the determined adjustment. For example, the controller 330 can generate suitable control signals to cause switches in the tuning circuit 340 to selectively connect (or disconnect) particular reactive elements to (or from) the antenna 310. In addition, the process 700 may be an iterative process that is performed to iteratively update the impedance tuning circuit in accordance with variations in the antenna impedance.

Figure 7B:
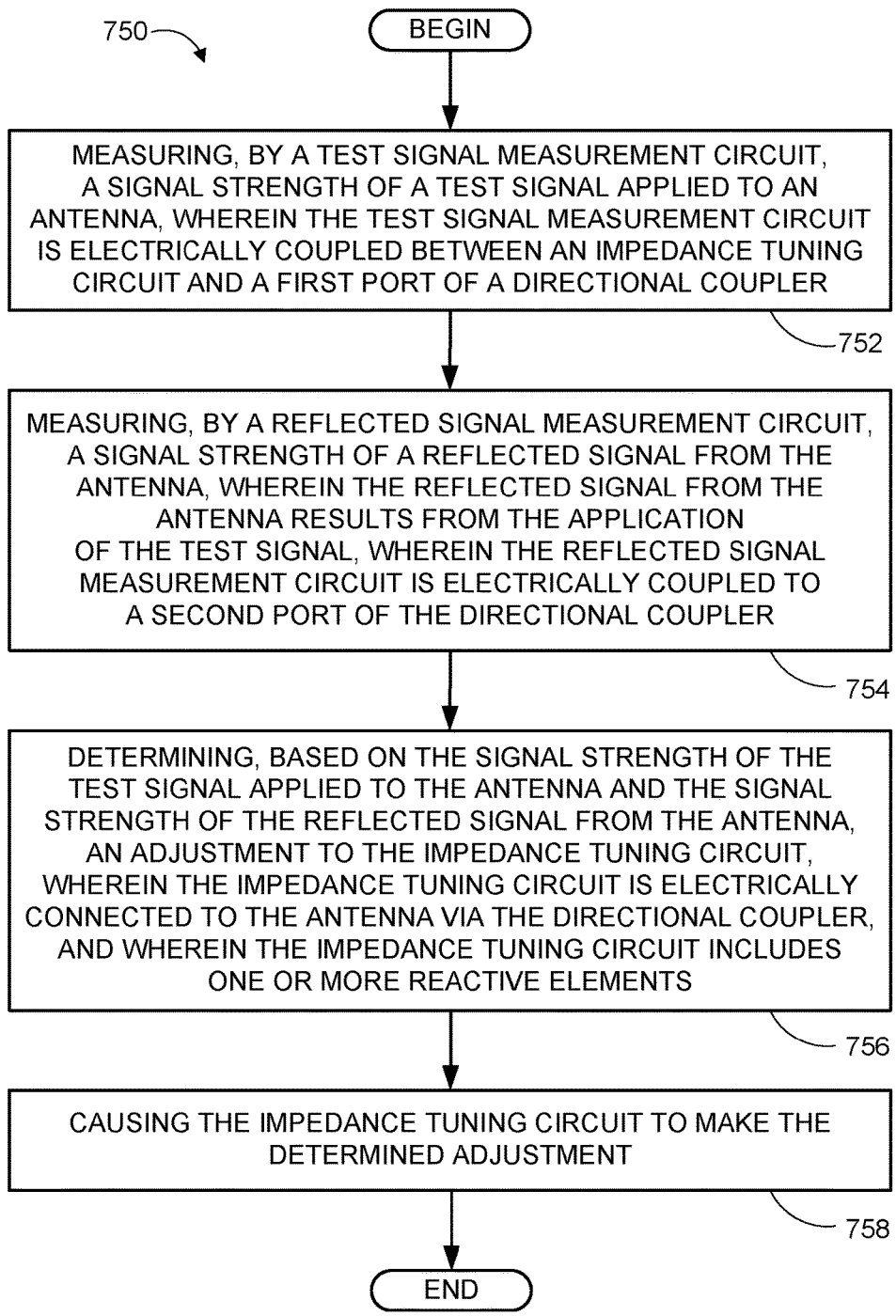
FIG. 7B is a flowchart of another example process involving adjusting an impedance tuning circuit.

FIG. 7B is a flowchart of an example process 750 involving adjusting an impedance tuning circuit. The example process 750 illustrated in FIG. 7B (blocks 752-758) describes operations of the system 401 shown in FIG. 4B and described above. Block 752 involves measuring, by a test signal measurement circuit (e.g., test signal measurement circuit 472), a signal strength of a test signal applied to an antenna (e.g., antenna 410). The test signal measurement circuit is electrically coupled between an impedance tuning circuit (e.g., impedance tuning circuit 490) and a first port of a directional coupler (e.g., directional coupler 460). Block 754 involves measuring, by a reflected signal measurement circuit (e.g., reflected signal measurement circuit 474), a signal strength of a reflected signal from the antenna. The reflected signal from the antenna results from the application of the test signal. The reflected signal measurement circuit is electrically coupled to a second port of the directional coupler. Block 756 involves determining, based on the signal strength of the test signal applied to the antenna and the signal strength of the reflected signal from the antenna, an adjustment to the impedance tuning circuit. The impedance tuning circuit is electrically connected to the antenna via the directional coupler, and the impedance tuning circuit includes one or more reactive elements. Block 758 involves causing the impedance tuning circuit to make the determined adjustment.

Moreover, it is particularly noted that while the body-mountable electronics platform is described herein by way of example as an eye-mountable device or an ophthalmic device, it is noted that the disclosed systems and techniques can be applied in other contexts as well. For example, contexts in which electronics platforms are operated with low power budgets (e.g., via harvested energy from radiated sources) or are constrained to small form factors (e.g., implantable bio-sensors or other wearable electronics platforms) may employ the systems and processes described herein to optimize their wireless power and/or data links. In one example, an implantable medical device may be encapsulated in biocompatible material and implanted within a host organism. The implantable medical device may include a circuit configured to wireless communicate and/or receive power via an antenna and an impedance tuning system configure to adjust the impedance connected to the antenna based on real time measurements of the antenna impedance.

Figure 8:
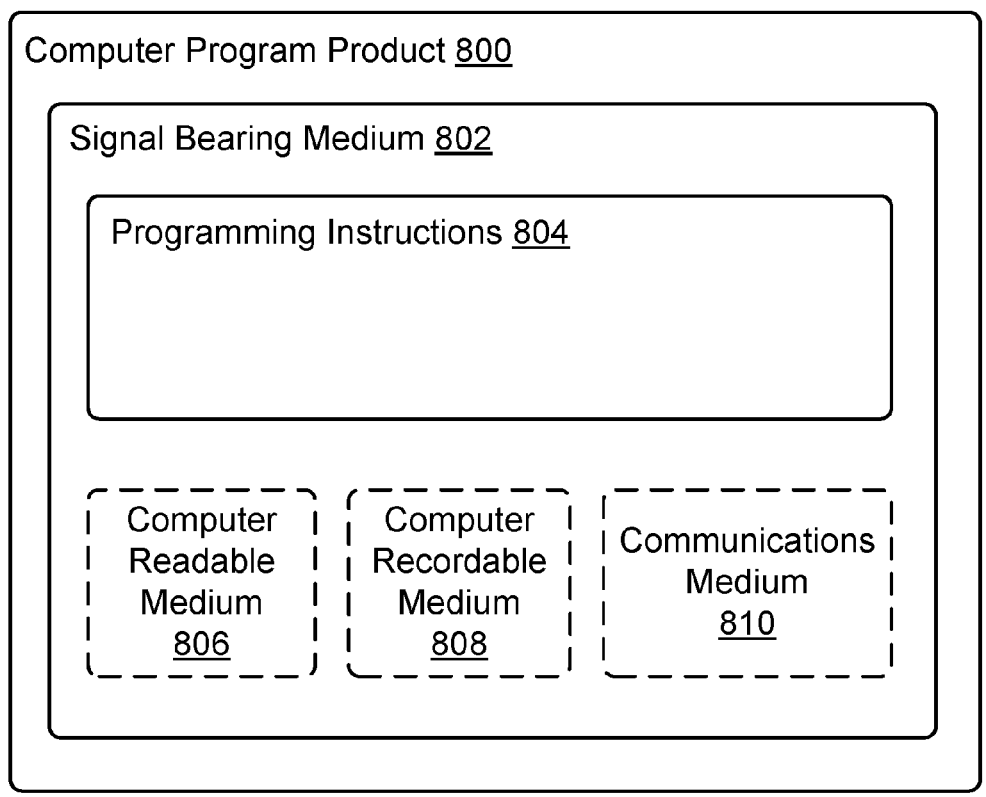
FIG. 8 depicts a computer-readable medium configured according to an example embodiment.

FIG. 8 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture (e.g., in the system 100, such non-transitory media may include instructions 184 stored on the memory storage 182 of the external reader 180, or instructions stored on the body-mountable device 110 and performed by the controller 150). FIG. 8 is a schematic illustrating a conceptual partial view of an example computer program product that includes a computer program for executing a computer process on a computing device, arranged according to at least some embodiments presented herein.

In one embodiment, the example computer program product 800 is provided using a signal bearing medium 802. The signal bearing medium 802 may include one or more programming instructions 804 that, when executed by one or more processors may provide functionality or portions of the functionality described above with respect to FIGS. 1-7. In some examples, the signal bearing medium 802 can be a non-transitory computer-readable medium 806, such as, but not limited to, a hard disk drive, a Compact Disc (CD), a Digital Video Disk (DVD), a digital tape, memory, etc. In some implementations, the signal bearing medium 802 can be a computer recordable medium 808, such as, but not limited to, memory, read/write (R/W) CDs, R/W DVDs, etc. In some implementations, the signal bearing medium 802 can be a communications medium 810, such as, but not limited to, a digital and/or an analog communication medium (e.g., a fiber optic cable, a waveguide, a wired communications link, a wireless communication link, etc.).

Thus, for example, the signal bearing medium 802 can be conveyed by a wireless form of the communications medium 810.

The one or more programming instructions 804 can be, for example, computer executable and/or logic implemented instructions. In some examples, a computing device is configured to provide various operations, functions, or actions in response to the programming instructions 804 conveyed to the computing device by one or more of the computer readable medium 806, the computer recordable medium 808, and/or the communications medium 810.

The non-transitory computer readable medium 806 can also be distributed among multiple data storage elements, which could be remotely located from each other. The computing device that executes some or all of the stored instructions could be an external reader, such as the reader 180 illustrated in FIG. 1, or another mobile computing platform, such as a smartphone, tablet device, personal computer, etc. Alternatively, the computing device that executes some or all of the stored instructions could be remotely located computer system, such as a server.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
    an antenna having a first antenna lead and a second antenna lead;
    a directional coupler comprising a first port, a second port, and a third port, wherein the first port is electrically connected to the first antenna lead and the second antenna lead, and wherein the directional coupler directs signals received at the first port to the second and third ports, directs signals received at the second port to the first port, and substantially isolates the second and third ports from each other;
    an impedance tuning circuit electrically connected to the second port of the directional coupler, wherein the impedance tuning circuit includes one or more reactive elements;
    a test signal measurement circuit electrically connected to the second port of the directional coupler;
    a reflected signal measurement circuit electrically connected to the third port of the directional coupler; and
    a controller, wherein the controller operates to: (i) receive, from the test signal measurement circuit, a test-signal measurement of a test signal applied to the antenna through the directional coupler; (ii) receive from the reflected signal measurement circuit a reflected-signal measurement of a reflected signal reflected from the antenna through the directional coupler in response to the test signal applied to the antenna; (iii) determine an adjustment to the impedance tuning circuit based on the test-signal measurement and the reflected-signal measurement; and (iv) cause the impedance tuning circuit to make the determined adjustment.

2. The system of claim 1, further comprising:
    a transceiver electrically connected to the second port of the directional coupler via the impedance tuning circuit, wherein the transceiver uses the antenna to send and receive signals, and wherein the transceiver has a predetermined impedance.

3. The system of claim 2, wherein the controller determines the adjustment to the impedance tuning circuit by a process comprising: (i) estimating an impedance of the antenna based on the test-signal measurement, the reflected-signal measurement, and a predetermined impedance of the directional coupler; (ii) determining a target impedance of the impedance tuning circuit based on the predetermined impedance of the transceiver and the estimated impedance of the antenna; and (iii) determining one or more adjustments to the impedance tuning circuit based on the target impedance.

4. The system of claim 1, wherein the controller makes the determined adjustment via one or more switches that selectively couple the one or more reactive elements to the antenna through the directional coupler, and wherein the one or more reactive elements include at least one of:
    a shunt capacitor coupled across the antenna leads via at least one of the one or more switches;
    a series capacitor coupled in series with one of the antenna leads via at least one of the one or more switches;
    a shunt inductor coupled across the antenna leads via at least one of the one or more switches; or
    a series inductor coupled in series with one of the antenna leads via at least one of the one or more switches.

5. The system of claim 1, wherein the controller makes the determined adjustment via one or more switches that selectively couple the one or more reactive elements to the antenna through the directional coupler, and wherein the one or more reactive elements include multiple shunt capacitors having respective capacitances, wherein each of the multiple capacitors is coupled across leads of the antenna via a respective one of the one or more switches.

6. The system of claim 1, further comprising:
    a polymeric material formed to include a body-mountable surface; and
    a substrate at least partially embedded within the polymeric material, wherein the antenna, the directional coupler, the test signal measurement circuit, the reflected signal measurement circuit, the impedance tuning circuit, and the controller are disposed on the substrate.

7. The system of claim 6, wherein the body-mountable surface is an eye-mountable surface.

8. A method comprising:
    measuring, by a test signal measurement circuit, a signal strength of a test signal applied to an antenna, wherein the test signal measurement circuit is electrically coupled between an impedance tuning circuit and a first port of a directional coupler;
    measuring, by a reflected signal measurement circuit, a signal strength of a reflected signal from the antenna, wherein the reflected signal from the antenna results from the application of the test signal, wherein the reflected signal measurement circuit is electrically coupled to a second port of the directional coupler;
    determining, based on the signal strength of the test signal applied to the antenna and the signal strength of the reflected signal from the antenna, an adjustment to the impedance tuning circuit, wherein the impedance tuning circuit is electrically connected to the antenna via the directional coupler, and wherein the impedance tuning circuit includes one or more reactive elements; and
    causing the impedance tuning circuit to make the determined adjustment.

9. The method of claim 8, wherein determining the adjustment to the impedance tuning circuit comprises:
    estimating an impedance of the antenna based on the signal strength of the test signal applied to the antenna, the signal strength of the reflected signal from the antenna, and a predetermined impedance of the directional coupler;

determining a target impedance of the impedance tuning circuit based on the estimated impedance of the antenna and a predetermined impedance of a transceiver coupled to the antenna through the impedance tuning circuit; and determining one or more adjustments to the impedance tuning circuit based on the target impedance.

10. A body-mountable device comprising:

a polymeric material formed to include a body-mountable surface;

a substrate at least partially embedded within the polymeric material;

an antenna disposed on the substrate, wherein the antenna has a first antenna lead and a second antenna lead;

a directional coupler comprising a first port, a second port, and a third port, wherein the first port is electrically connected to the first antenna lead and the second antenna lead;

an impedance tuning circuit disposed on the substrate, wherein the impedance tuning circuit is electrically connected to the second port of the directional coupler, wherein the impedance tuning circuit includes one or more reactive elements;

a test signal measurement circuit disposed on the substrate, wherein the test signal measurement circuit is electrically connected to the second port of the directional coupler;

a reflected signal measurement circuit disposed on the substrate, wherein the reflected signal measurement circuit is electrically connected to the third port of the directional coupler; and a controller disposed on the substrate, wherein the controller operates to: (i) receive, from the test signal measurement circuit, a test-signal measurement of a test signal applied to the antenna through the directional coupler; (ii) receive from the reflected signal measurement circuit a reflected-signal measurement of a reflected signal reflected from the antenna through the directional coupler in response to the test signal applied to the antenna; (iii) determine an adjustment to the impedance tuning circuit based on the test-signal measurement and the reflected-signal measurement; and (iv) cause the impedance tuning circuit to make the determined adjustment.

11. The body-mountable device of claim 10, wherein the body-mountable surface is an eye-mountable surface.

* * * * *